(12) United States Patent
Hao et al.

(10) Patent No.: US 9,071,653 B2
(45) Date of Patent: Jun. 30, 2015

(54) REDUCING CELLULAR NETWORK TRAFFIC

(75) Inventors: Jack Jianxiu Hao, Lexington, MA (US);
Diego S. Rozensztejn, Brighton, MA (US); John F. Gallagher, Hopewell, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 602 days.

(21) Appl. No.: 13/440,125

(22) Filed: Apr. 5, 2012

(65) Prior Publication Data

US 2013/0267207 A1   Oct. 10, 2013

(51) Int. Cl.
- *H04M 3/42* (2006.01)
- *H04L 29/08* (2006.01)
- *G06F 17/30* (2006.01)
- *H04W 4/02* (2009.01)
- *H04W 4/18* (2009.01)

(52) U.S. Cl.
CPC ............. *H04L 67/306* (2013.01); *G06F 17/30* (2013.01); *H04W 4/028* (2013.01); *H04W 4/18* (2013.01)

(58) Field of Classification Search
CPC ...... G06F 17/30; H04W 88/06; H04W 88/18; H04W 88/028
USPC ........................................... 455/414.1
See application file for complete search history.

(56) References Cited

U.S. PATENT DOCUMENTS

| | | | |
|---|---|---|---|
| 2002/0080721 A1* | 6/2002 | Tobagi et al. | 370/236 |
| 2010/0042683 A1* | 2/2010 | Fricke et al. | 709/203 |
| 2012/0011256 A1* | 1/2012 | Masuda et al. | 709/227 |
| 2013/0029732 A1* | 1/2013 | Kim | 455/574 |

* cited by examiner

*Primary Examiner* — Shahriar Behnamian

(57) ABSTRACT

A system is configured to store a user profile associated with a user, the user profile including: a first time, a time period, a list of content accessed by the one or more devices from one or more servers. The system may further be configured to identify particular content based on the list of content from the user profile; determine an amount of particular content to transfer based on the time period; and automatically transfer at least the amount of particular content from one or more servers to the one or more devices over a local area network, prior to the first time.

20 Claims, 21 Drawing Sheets

| User ID | Device List | List of User Locations | List of WLANs Used/Subscribed To | Travel Pattern Information | Frequently Accessed Content | Manually Specified Content | Prioritized Content List |
|---|---|---|---|---|---|---|---|
| jsmith | Smart Phone | Home | DCA Airport | Home-Coffee | Law and Order | Golden Girls | Golden Girls |
| | Tablet | Work | Coffee shop | Coffee-Work | Golden Girls | Law and Order | Law and Order |
| | Laptop | Friend's house | Donut shop | Work-Home | Seinfeld | The Office | The Office |
| | Desktop | Coffee shop | Hotel | Home-Gym | The Office | Seinfeld | Seinfeld |
| | DVR | Candy store | Library | Gym-Work | | Jeopardy | |
| | | LAX | Bookstore | Work-Home | | Judge Judy | |
| | | DCA | Home | | | | |

Fig. 6A

| Start Location | End Locaton | Start Time 1 | End Time 1 | Start Time 2 | End time 2 | ... | Start Time N | End time N |
|---|---|---|---|---|---|---|---|---|
| Home | Coffee Shop | T 8:00AM | T 8:15AM | Th 8:00AM | Th 8:15AM | | | |
| Coffee Shop | Work | T 8:30AM | T 9:00AM | Th 8:30AM | Th 9:00AM | | | |
| Work | Home | T 5:30PM | T 6:00PM | T 5:30PM | T 6:00PM | | | |
| Home | Gym | M 8:00AM | M 8:30AM | W 8:00AM | W 8:30AM | | | |
| Gym | Work | M 9:30AM | M 10:00AM | W 9:30AM | W 10:00AM | | | |
| Work | Home | M 6:30PM | M 7:00PM | W 6:30PM | W 7:00PM | | | |

| Content Name | Days/times frequently accessed |
|---|---|
| Law and Order | M 8:00AM-9:00AM, Thu 10:00AM-11:00AM |
| Golden Girls | M 8:30AM-9:30AM, Thu 11:00AM-11:30AM |
| The Office | M 10:00AM-11:00AM, Fri 10:00AM-11:00AM |
| Seinfeld | T 8:00AM-9:00AM, W 10:00AM-11:00AM |

| Content Name | Channel | Priority |
|---|---|---|
| Golden Girls | HALLMARK, 70 | 1 |
| Law and Order | NBC, 4 | 2 |
| The Office | NBC, 4 | 3 |
| Seinfeld | NBC, 4 | 4 |
| Jeopardy | ABC, 7 | 5 |
| Judge Judy | UPN, 20 | 6 |

REDUCING CELLULAR NETWORK TRAFFIC

BACKGROUND

Users often use user devices to access content, such as multimedia content. User devices can access the content wirelessly through a cellular network or through a nearby wireless fidelity (WiFi) network. A WiFi network has a limited range of connectivity and, therefore, a cellular network connection may be used by a user device to access content. Heavy usage of a cellular network puts a strain on the cellular network, thereby causing major network problems, such as slow network speeds, network outages, and high network repair and maintenance costs.

BRIEF DESCRIPTION OF THE DRAWINGS

FIGS. 6A-6D are diagrams of an example data structure that may be stored in a user profile;

DETAILED DESCRIPTION OF THE PREFERRED EMBODIMENTS

The following detailed description refers to the accompanying drawings. The same reference numbers in different drawings may identify the same or similar elements.

A system and/or method, as described herein, may reduce traffic on a cellular network caused by activity from a user device. For example, the system and/or method may use data in a user profile to identify particular content in which a user may be interested, to identify a particular time to transfer the particular content to a user device associated with the user, and/or to transfer the particular content at the particular time. In one implementation, the particular time might correspond to when the user device is connected to a local area network (LAN), such as a wireless LAN (WLAN). In one implementation, the user profile may be used to identify time periods in which a user device, associated with the user, is connected to (or disconnected from) a LAN.

The system and/or method may further include locating a WLAN along a traveling route, and connecting the user device to the WLAN once the user device is in connection range of the WLAN. The system and/or method may further include informing a user, associated with the user device, about a nearby WLAN, and connecting the user device to a WLAN when the user device is in connection range of the WLAN.

Figure 1A:
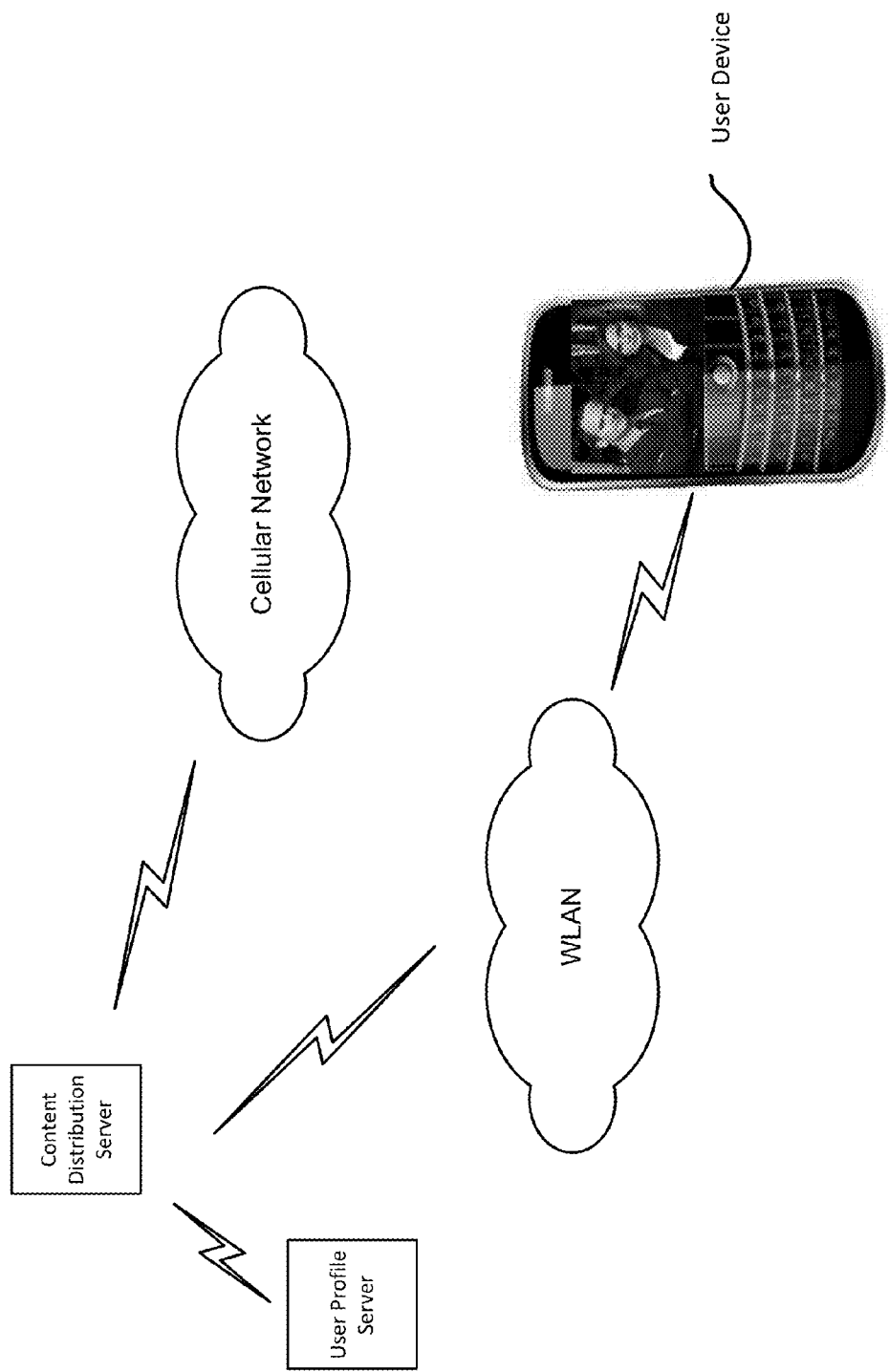
FIGS. 1A-1B illustrate an overview of an example implementation described herein.
Figure 1B:
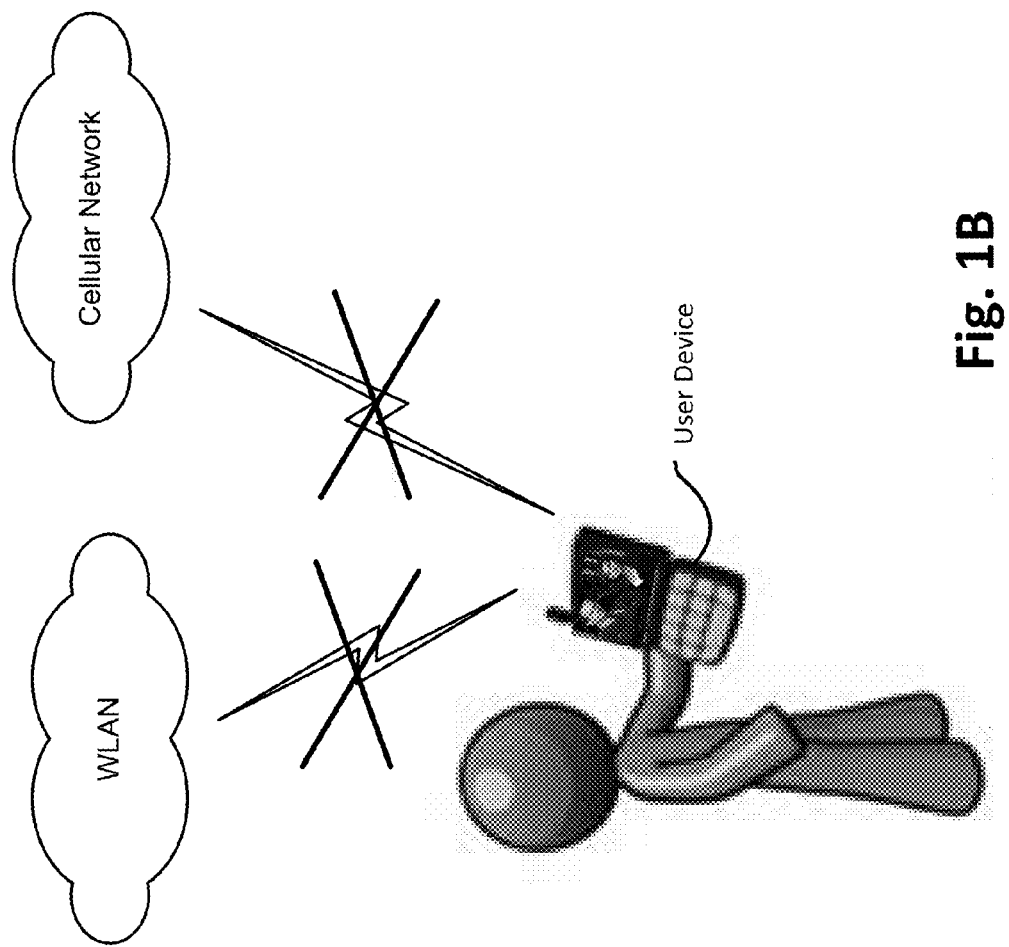

FIGS. 1A and 1B are diagrams of an overview of an example implementation described herein. As shown in FIG. 1A, a user, via a user device, may obtain content, such as multimedia content, from a content distribution server. For example, the user device may communicate with the content distribution server to obtain video content that may be played on a display screen of the user device.

As shown in FIG. 1A, the user device may communicate with the content distribution server via a WLAN or a cellular network. To minimize costs associated with communicating via the cellular network, the user device may communicate with the content distribution server via the WLAN when the user device is located within range of the WLAN. When the user device is located outside of the range of the WLAN, the user device may communicate with the content distribution server via the cellular network.

As shown in FIG. 1A, the content distribution server may communicate with a user profile server, which may store one or more user profiles. The content distribution server may use the user profile to determine what content to transfer to the user device, at what time the transfer should occur, and how much of the content to transfer. For example, the content distribution server may use the user profile to identify particular content in which the user may be interested, such as content that the user is currently accessing but has not yet finished, content that the user has accessed frequently in the past, content in which the user has specified an interest, etc. The content distribution server may also use the user profile to identify a time period associated with a user's travel routine, such as the user's regular commute to work, the gym, the airport, etc. The content distribution server may transfer content to the user device when the user is connected via the WLAN and in advance of the user's travel routine.

As shown in FIG. 1B, assume that the user device has moved to a location that is outside the range of the WLAN. In this case, the user device may play the content, which was previously transferred to the user device from the content distribution server, on the display screen of the user device without needing to communicate with the content distribution server via the cellular network. As a result, costs, associated with communicating via the cellular network, may be reduced or eliminated.

Figure 2:
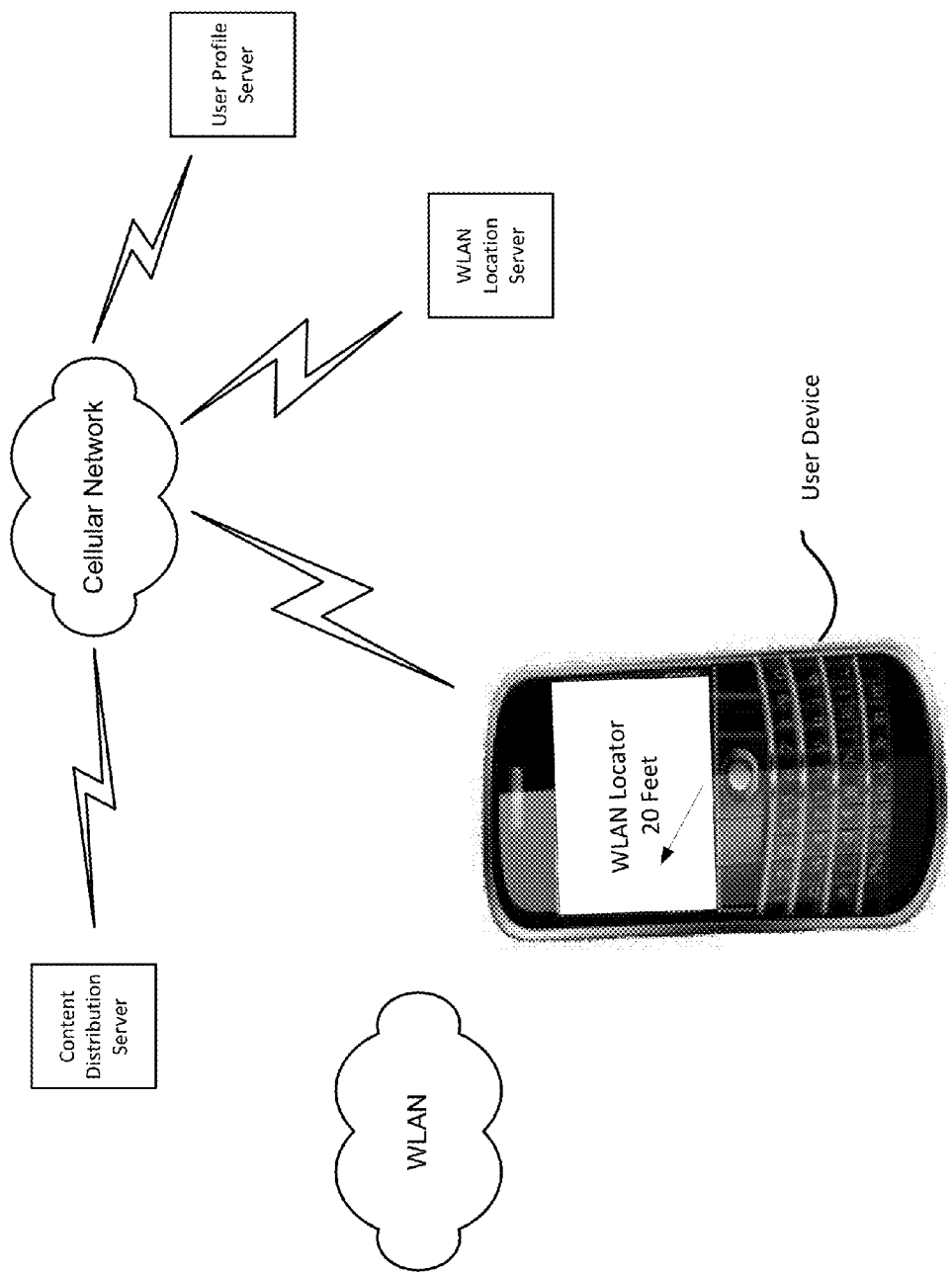
FIG. 2 illustrates an overview of an example implementation described herein.

FIG. 2 is a diagram of an overview of an example implementation described herein. As shown in FIG. 2, assume that the user device is at a location that is outside the range of the WLAN. In this case, the user device may communicate with the user profile server and/or a WLAN location server via the cellular network. The user profile server and WLAN location server may provide a list of WLAN locations to the user device. The user device may then display directions to a nearby WLAN location. If the user device is moved to the WLAN location, the user device may communicate with the content distribution server via the WLAN. As a result, costs, associated with communicating via the cellular network, may be reduced or eliminated.

Figure 3:
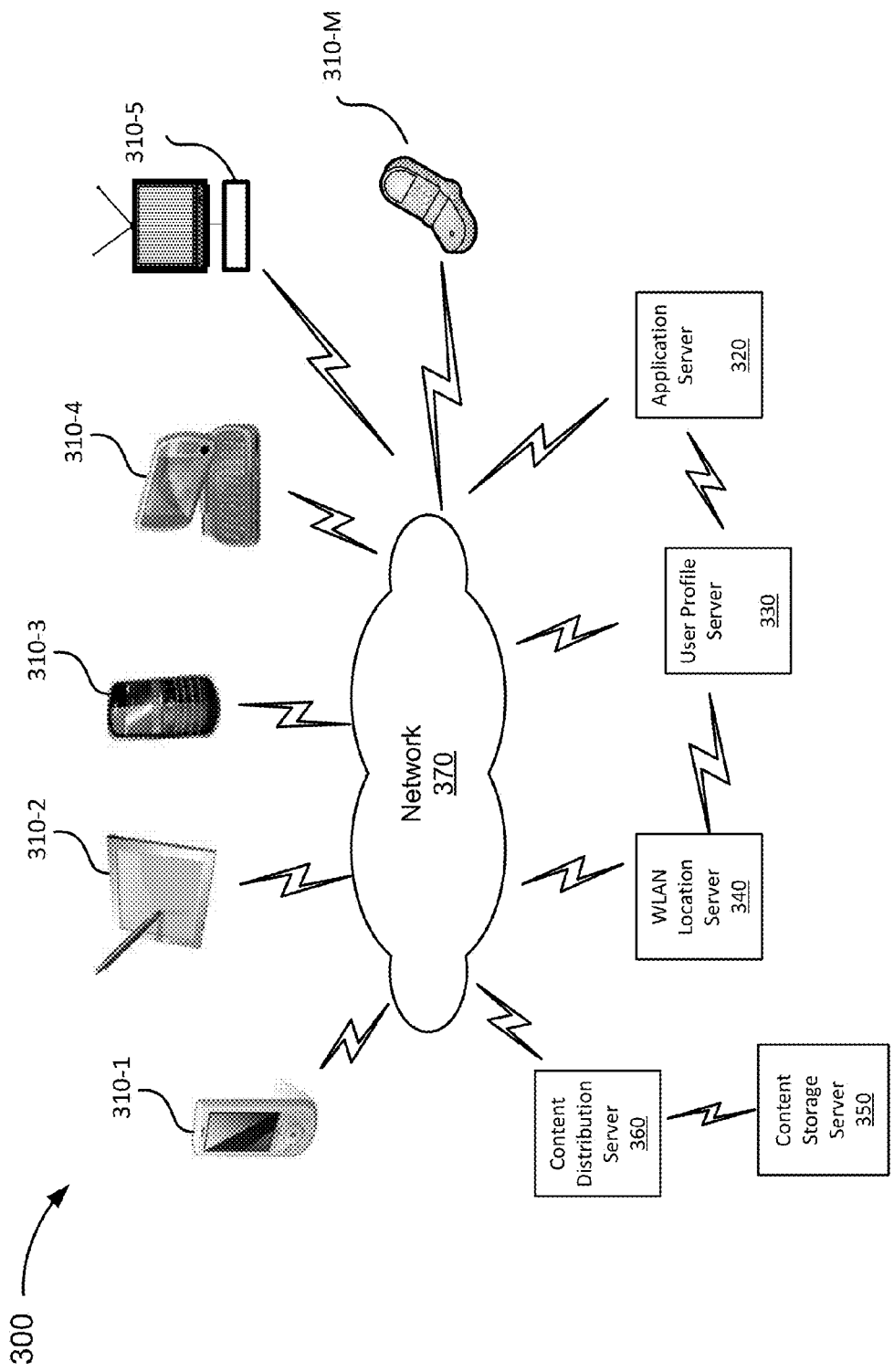
FIG. 3 is a diagram that illustrates an example environment in which systems and/or methods, described herein, may be implemented.

FIG. 3 is a diagram that illustrates an example environment 300 in which systems and/or methods, described herein, may be implemented. As shown in FIG. 3, environment 300 may include user devices 310-1, 310-2, ..., 310-M (where M≥1)

(collectively referred to as "user devices 310," and individually as "user device 310"), an application server 320 (hereinafter referred to as "app server 320"), a user profile server 330, a WAN location server 340, a content storage server 350, a content distribution server 360, and a network 370. While FIG. 3 shows a particular number and arrangement of devices, in practice, environment 300 may include additional devices, fewer devices, different devices, or differently arranged devices than are shown in FIG. 3. For example, each of servers 320-360 may be implemented as multiple, possibly distributed, devices. Alternatively, two or more of servers 320-360 may be implemented within a single device. Further, a function described as being performed by one server may be performed by another server.

User device 310 may include any portable or non-portable device capable of communicating via a network. For example, user device 310 may correspond to a mobile communication device (e.g., a mobile phone or a personal digital assistant (PDA)), a portable computer device (e.g., a laptop or a tablet computer), or another type of portable device. User device 310 may also, or alternatively, include a client device such as a set top box for a television, a digital video recorder (DVR), a desktop computer, or the like.

App server 320 may include a server device, such as a computing device, that provides a video content application or performs user authentication, content listing management, or order processing. For example, app server 320 may permit user device 310 to download a video content application that may permit a user to find video content of interest or play downloaded or streaming video content. Also, or alternatively, app server 320 may provide video content metadata, such as lists or categories of video content. Also, or alternatively, app server 320 may authenticate a user who wishes to purchase, rent, or subscribe to video content. In one implementation, the interactions between app server 320 and user device 310 may be performed using the hypertext transfer protocol (HTTP) or the secure HTTP (HTTPS). In one implementation, the interactions between app server 320 and user device 310 may be performed using another type of protocol.

User profile server 330 may include a server device, such as a computing device, that stores user profile information for users. The user profile information may include various information regarding a user, such as a user identifier (ID), user login information (e.g., user name and password), billing information, address information, types of services to which the user has subscribed, a list of video content purchased by the user, a list of video content rented by the user, a prioritized list of video content to which the user has subscribed, ratings of video content by the user, a list of content currently being accessed by the user, a device identifier (e.g., a user device identifier, a set top box identifier, a personal computer identifier) for devices used by the user, a list of WLANs used or subscribed to by the user, a list of geographic locations visited by the user, a video content application identifier associated with the video content application obtained from app server 320, or the like. The user profile information may also include information regarding travel patterns of the user, such as daily commute times from the user's home to the user's office, and information regarding time periods associated with the travel patterns, such as average daily commute durations from the user's home to the user's office. App server 320 may use the user profile information to authenticate a user and may update the user profile information based on the user's activity. Information regarding a user's activity, such as the user's travel patterns and the time periods associated with those travel patterns, may be collected only with the user's express permission.

WLAN location server 340 may include a server device, such as a computing device, that provides location information for particular WLANs. For example, WLAN location server 340 may include location information, such as longitude and latitude coordinates, street addresses, WiFi network names, WiFi network credentials, and facility names and types (hotels, bookstores, shops, etc) associated with the location of WiFi networks, mobile hot spots, wireless ad-hoc networks, etc. WLAN location server 340 may contain information for both public and private WLANs. App server 320, or any other server, may update information stored by WLAN location server 340 with current information relating to the locations of WLANs.

Content storage server 350 may include a server device, such as a computing device, that stores or processes video content. For example, content storage server 350 may perform encoding operations on video content using, for example, public/private keys. Content storage server 350 may also perform transcoding operations on the video content. Content storage server 350 may store video content in encrypted form.

Content distribution server 360 may include a server device, such as a computing device, that delivers video content to user devices 310. For example, content distribution server 360 may permit a user device 310 to download particular video content once the user, of user device 310, has been properly authenticated. In one implementation, the downloading of video content may occur using the file transfer protocol (FTP). In another implementation, the downloading of video content may occur using another type of protocol. In some implementation, content distribution server 360 may receive content, such as television programs or movies that are currently being broadcasted from a television station. Content distribution server 360 may subsequently deliver the content as the content is received (i.e., streaming), in response to a request from user device 310 to receive the content. In one implementation, content distribution server 360 may deliver content in the form of video on demand (VOD), where content is stored locally and is then delivered, in response to a request from user device 310 to receive content.

Network 370 may include any type of network or a combination of networks. For example, network 370 may include a LAN, a wide area network (WAN) (e.g., the Internet), a metropolitan area network (MAN), an ad hoc network, a telephone network (e.g., a Public Switched Telephone Network (PSTN), a cellular network, or a voice-over-IP (VoIP) network), or a combination of networks. Each of user device 310, and servers 320-360 may connect to network 370 via a wireless connection, a wired connection, or a combination thereof.

The description to follow will describe a user device 310 as obtaining multimedia content via a WLAN. In practice, however, user device 310 may use other types of networks to obtain the multimedia content. For example, user device 310 may download multimedia content via a wired LAN, a wireless wide area network (WWAN) (e.g., EVDO (evolution data optimized)), sideloading (i.e., a transfer between two local devices), or a cable (e.g., USB).

Figure 4:
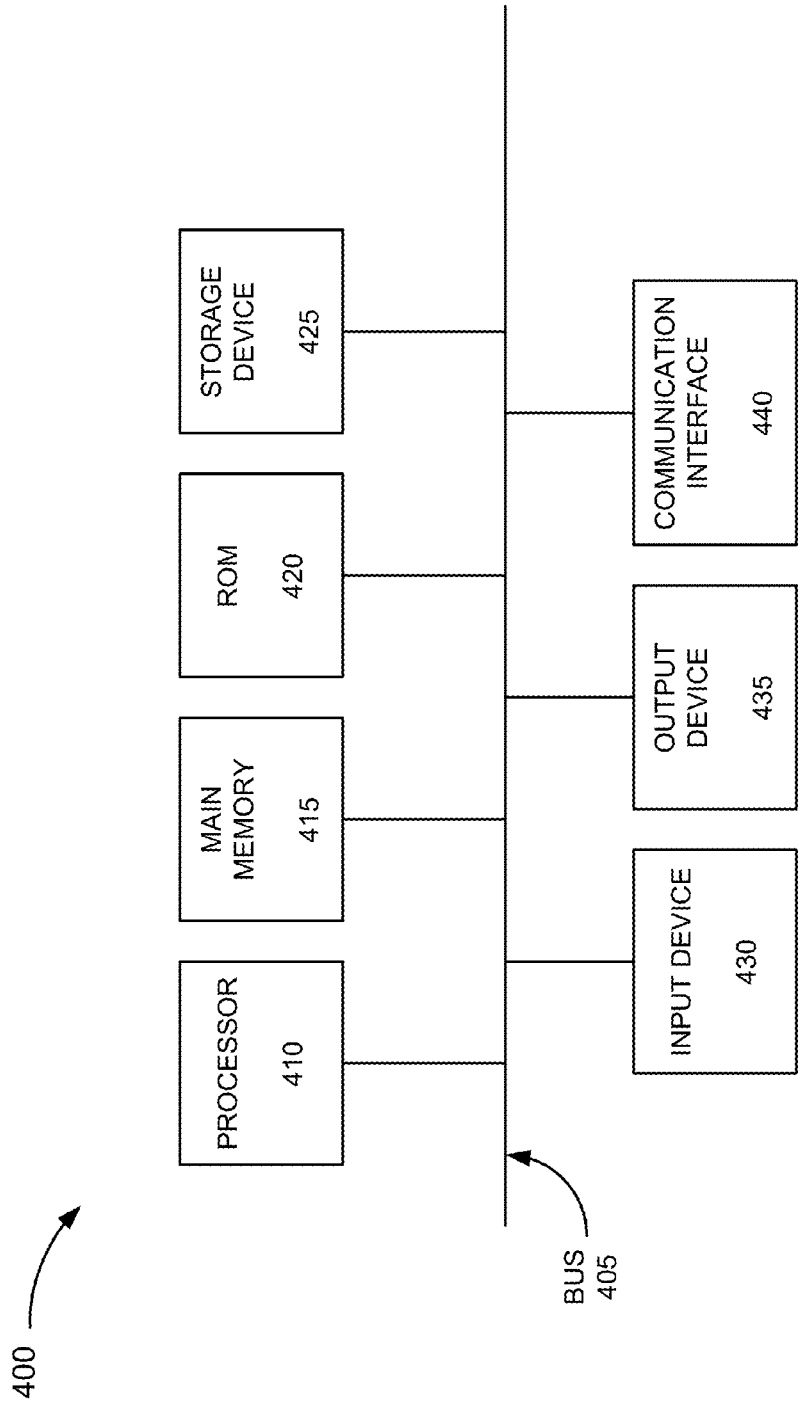
FIG. 4 is a diagram of example components of a device that may be used within the environment of FIG. 3.

FIG. 4 is a diagram of example components of a device 400. Device 400 may correspond to user device 310, app server 320, user profile server 330, WLAN location server 340, content storage server 350, or content distribution server 360. Each of user device 310, app server 320, user profile server 330, WAN location server 340, content storage server 350, and content distribution server 360 may include one or more devices 400.

As shown in FIG. 4, device 400 may include a bus 405, a processor 410, a main memory 415, a read only memory (ROM) 420, a storage device 425 (also referred to as a local storage device or local storage), an input device 430, an output device 435, and a communication interface 440. In one implementation, device 400 may include additional components, fewer components, different components, or differently arranged components. For example, in the context of user device 310, device 400 may include a location determination unit, such as a global positioning system (GPS), that may determine a geographic location of device 400.

Bus 405 may include a path that permits communication among the components of device 400. Processor 410 may include a processor, a microprocessor, an application specific integrated circuit (ASIC), a field programmable gate array (FPGA), or another type of processor that interprets and executes instructions. Main memory 415 may include a random access memory (RAM) or another type of dynamic storage device that stores information or instructions for execution by processor 410. ROM 420 may include a ROM device or another type of static storage device that stores static information or instructions for use by processor 410. Storage device 425 may include a magnetic storage medium, such as a hard disk drive, or a removable memory, such as a flash memory.

Input device 430 may include a mechanism that permits an operator to input information to device 400, such as a control button, a keyboard, a keypad, or another type of input device. Output device 435 may include a mechanism that outputs information to the operator, such as a light emitting diode (LED), a display, or another type of output device. Communication interface 440 may include any transceiver-like mechanism that enables device 400 to communicate with other devices or networks. In one implementation, communication interface 440 may include a wireless interface, a wired interface, or a combination of a wireless interface and a wired interface.

Device 400 may perform certain operations, as described in detail below. Device 400 may perform these operations in response to processor 410 executing software instructions contained in a computer-readable medium, such as main memory 415. A computer-readable medium may be defined as a non-transitory memory device. A memory device may include space within a single physical memory device or spread across multiple physical memory devices.

The software instructions may be read into main memory 415 from another computer-readable medium, such as storage device 425, or from another device via communication interface 440. The software instructions contained in main memory 415 may cause processor 410 to perform processes that will be described later. Alternatively, hardwired circuitry may be used in place of or in combination with software instructions to implement processes described herein. Thus, implementations described herein are not limited to any specific combination of hardware circuitry and software.

Figure 5:
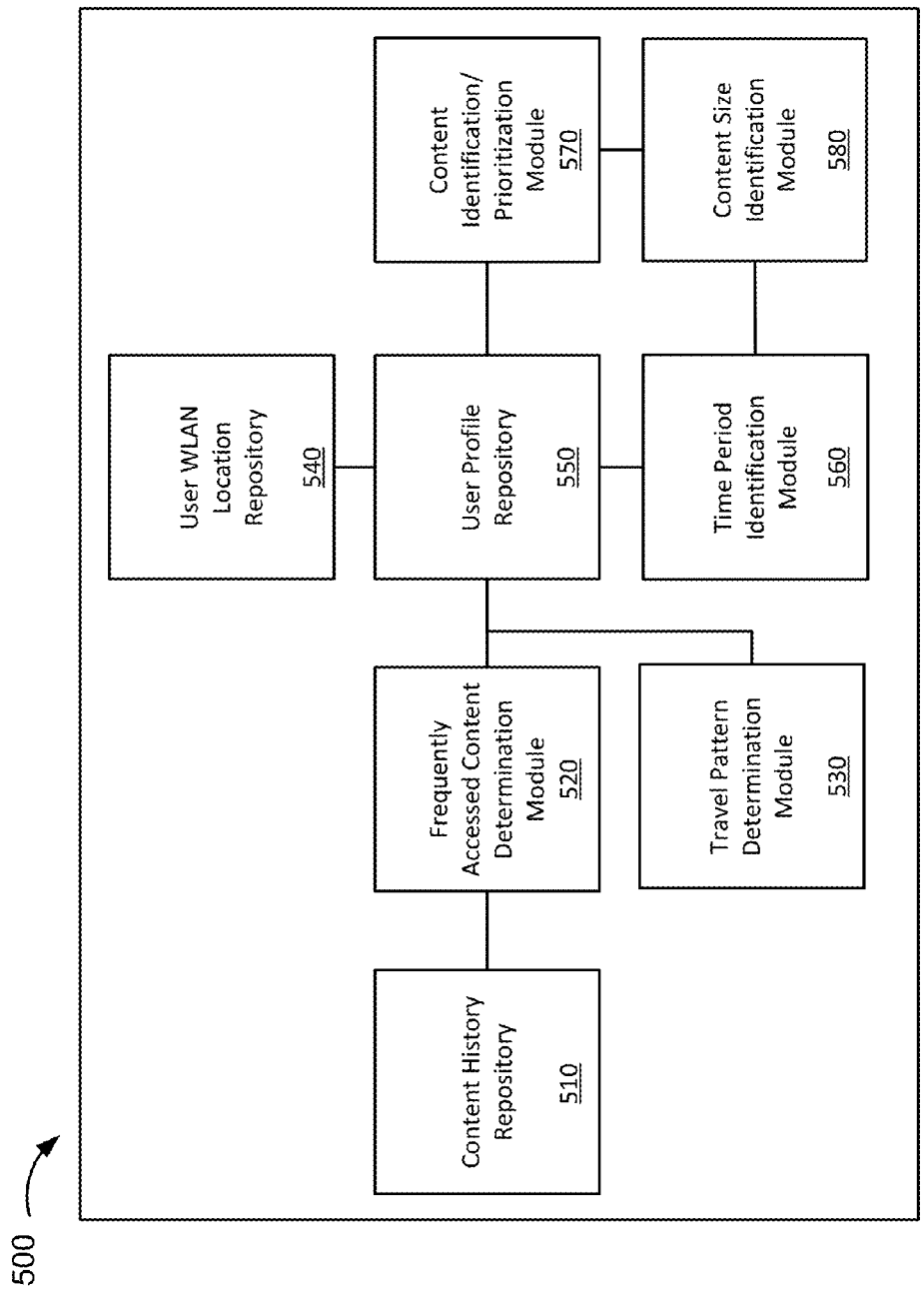
FIG. 5 is a diagram of example functional components of an example system.

FIG. 5 is a diagram of example functional components of an example system 500. System 500 may correspond to, for instance, user profile server 330. In another implementation, system 500 may correspond to components of one or more of servers 320-360. As shown in FIG. 5, system 500 may include modules 510-580. In some implementations, system 500 may include fewer modules, additional modules, or different modules. Any, or all, of modules 510-580 may be implemented by one or more memory devices (such as main memory 415) and/or one or more processors (such as processor 410). Furthermore, multiple modules may be associated with the same memory device and/or processor (e.g., one memory device, or one set of memory devices, may store information associated with two or more of modules 510-580).

Content history repository 510 may receive and/or store information that identifies a history of content accessed by user device 310. For example, content history repository 510 may use data logging software, or some other technique, to identify instances where user device 310 has accessed content. In some implementations, content history repository 510 may identify information regarding content accessed by user device 310, such as content type (e.g., video, music, images, text, etc.), content name, channel numbers and/or channel names associated with content (e.g., channel 4, NBC, etc.), and/or dates and times associated with accessed content (e.g., when the content was broadcast, when the content was accessed by user device 310, etc.).

Frequently accessed content determination module 520 may receive and/or store information that determines frequently accessed content of user device 310. In order to make such a determination, module 520 may receive content history information from content history repository 510. Module 520 may then use data logging software, or some other technique, to determine the frequency of content accessed by user device 310. Module 520 may also determine what is considered to be frequently accessed content versus infrequently accessed content. In one implementation, module 520 may determine, based on information from content history repository 510, the number of times that content has been accessed within a period of time. For example, assume that module 520 determines, based on information from content history repository 510, that the television program "Law and Order" has been accessed 100 times by user device 310, that the television program "Golden Girls" has been accessed 90 times, that the television program "The Office" has been accessed 80 times, and that the television program "Bridezillas" has been accessed 10 times within the same period of time (e.g. one month). In one implementation, module 520 may identify the television programs "Law and Order," "Golden Girls," and "The Office" as frequently accessed content, since these television programs have been accessed more in relation to the television program "Bridezillas."

In one implementation, module 520 may identify frequently accessed content based on content accessed greater than a threshold quantity of times within a time period. For example, if the threshold is 20 times in one month, then in the above example, the television program "Bridezillas" would not be considered as frequently accessed content. If, on the other hand, the threshold was 5 times in one month, then the television program "Bridezillas" would be considered as frequently accessed content.

Travel pattern determination module 530 may receive and/or store information that determines a travel pattern and/or patterns of a user associated with user device 310. In order to make such a determination, module 530 may identify geographic locations associated with user device 310, and/or times of travel of user device 310, in the context of travel routes frequented by the user. The geographic location information may include addresses, geographic coordinates, and/or any other information that identifies particular geographic locations along a travel route. Times of travel may include a start time (or alternatively, a first time) when the user departs from a start location, associated with a travel route, and/or an end time (or alternatively, a second time) when the user reaches a destination location associated with the travel route. In some implementations, module 530 may identify multiple start times, end times, start locations, and end locations, corresponding to a user's travel pattern.

In one implementation, module 530 may obtain travel pattern information from user device 310 associated with the user. For example, module 530 may automatically identify information regarding travel routes and/or times, frequented by the user. In some implementations, module 530 may identify, based on a location determination unit of user device 310, when user device 310 has moved a particular distance from the start location (e.g., the start time), and when user device 310 has reached the destination location (e.g., the end time). Additionally, or alternatively, the user may interact with module 530, via user device 310, to provide the travel routes and/or times information.

The start location and destination location may correspond to any number of locations associated with a user's routine travel pattern. For example, module 530 may identify that a user may routinely leave a start location (e.g., the user's home) at 8 AM (i.e., a start time of 8 AM) and arrive at a destination location (e.g., a gym) at 8:30 AM (i.e., an end time of 8:30 AM). Further, module 530 may identify that a user may routinely leave the gym (i.e., a start location) at 9:30 AM (i.e., a start time of 9:30 AM), and arrive at a destination location (e.g., his/her office) at 10 AM (i.e., an end time of 10 AM).

In one implementation, module 530 may identify a travel pattern based on daily commuting routes between the user's home and the user's office, average value and/or standard deviation of travel time between the user's home and the user's office, average value and/or standard deviation of departure time of user from user's home to user's office, average value and/or standard deviation of departure time from user's home to another user location (shops, airports, etc), and/or average value and/or standard deviation of travel time of the user between any two locations. Module 530 may collect multiple data points to establish a travel pattern associated with a user.

User WLAN location repository 540 may receive and/or store information identifying WLANs associated with user device 310. For example, user WLAN location repository 540 may identify WLAN information from user device 310 such as geographic coordinates, address information, and login credential information associated with one or more WLAN locations. The login credential information may include any information that may be used to authenticate user device 310 to access the WLAN. In one implementation, user WLAN location repository 540 may identify geographic location and login credential information for WLANs accessed or subscribed to at airports, hotels, coffee shops, libraries, offices, residential locations, etc. User WLAN location repository 540 may also identify, for example, WLAN information for airports, hotels, and visiting offices associated with frequent flying routes. In one implementation, user WLAN location repository 540 may automatically identify WLAN location information (e.g., geographic coordinates and address information) from a location determination unit in user device 310. Additionally, or alternatively, a user may interact, via user device 310, with user WLAN location repository 540 to provide the WLAN location information.

User profile repository 550 may receive and/or store information identifying frequently accessed content, WLAN location information, and travel pattern information of a user, associated with user device 310. For example, user profile repository 550 may receive frequently accessed content information, based on module 520. Additionally, user profile repository 550 may receive information on WLAN locations from user WLAN location repository 540. Further, user profile repository 550 may receive information regarding one or more travel patterns of a user, associated with user device 310, based on information from module 530. User profile repository 550 may be used to identify time periods during which user device 310, associated with the user, is outside WLAN range, and to identify and prioritize content, associated with the user. FIGS. 6A-6D, described below, provide examples of example data structures that may be associated with user profile repository 550.

Time period identification module 560 may receive and/or store information identifying one or more time periods during which a user device 310, associated with the user, is anticipated to be outside of WLAN range. Module 560 may obtain information identifying one or more travel patterns of a user, associated with user device 310, based on information from user profile repository 550. Additionally, module 560 may obtain WLAN locations from WLAN location server 340 and/or user profile repository 550. Module 560 may use information from user profile repository 550, and/or WLAN location server 340 to identify one or more time periods during which user device 310, associated with the user, is anticipated to be outside of WLAN range.

For example, based on the user's travel pattern information from user profile repository 550, module 560 may identify that a user leaves his/her home location at 8 AM, and arrives at his/her office location at 9 AM. Further, module 560 may identify, from user profile repository 550 and/or from WLAN location server 340, that a WLAN exists at the user's home location and a WLAN exists at the user's office location. Thus, module 560 may determine that user device 310, associated with the user, may exit WLAN range starting at 8 AM. Module 560 may also determine that when the user arrives at his/her work location at 9 AM, user device 310, associated with the user, may then re-enter WLAN range. In this instance, module 560 may identify a time period of 8 AM to 9 AM, corresponding to a time period during which user device 310 is anticipated to be outside of WLAN range.

In one implementation, module 560 may identify, based on information from user profile repository 550, that a user routinely leaves his/her home on Monday, Wednesday, and Friday mornings at 8 AM for the gym. Module 560 may further identify, based on information from user profile repository 550, that the user arrives at the gym at 8:30 AM on Mondays, Wednesdays, and Fridays. Module 560 may also identify, based on information from user profile repository 550, that that the user subscribes to a WLAN at his/her home location, and a WLAN at the gym location. Further, module 560 may identify, based on information from user profile repository 550, that the user leaves the gym at 9:30 AM, and arrives at his/her office at 10 AM. Module 560 may further identify, based on user profile repository 550, that the user subscribes to a WLAN at his/her office location. In this example, module 560 may identify a time period of 8:00 AM to 8:30 AM, and 9:30 AM to 10 AM on Mondays, Wednesdays, and Fridays during which user device 310, associated with the user, is anticipated to be outside of WLAN range.

Additionally, or alternatively, the user may interact (e.g., via user device 310) with user profile repository 550 to manually enter a travel path with starting origin, destination, start time, and end time. Module 560 may identify the time period during which user device 310, associated with the user, is outside WLAN range in a similar manner to that described above based on the manually entered travel route, and WLAN locations from user profile repository 550 and/or WLAN location server 340.

It will be apparent that the above illustrates some specific examples for identifying time periods during which user device 310 is anticipated to be outside of WLAN range. Module 560 may identify time periods during which user device 310 is anticipated to be outside of WLAN range based on a theoretically unlimited number of possibilities, with respect to a user's travel pattern. Module 560 may also identify time periods using any other technique.

Content identification/prioritization module 570 may receive and/or store information identifying and prioritizing a list of content, based on information from user profile repository 550. In one implementation, module 570 may use rules and/or algorithms to identify and prioritize content based on frequently accessed content, content currently being accessed by user device 310, and/or a manually specified list of content.

For example, module 570 may use a rule and/or algorithm to identify and prioritize content, based on the frequency of the content accessed, and a time in which the content is accessed. For example, module 570 may identify, based on information from user profile repository 550, that the user frequently accesses the television programs "Law and Order" on Thursday mornings at 10 AM and "Golden Girls" on Thursday mornings at 11 AM. In one implementation (e.g., on Thursday mornings), module 570 may identify the television programs "Law and Order" and "Golden Girls" as the identified content t based on the information from user profile repository 550. Further, module 570 may prioritize the identified content, based on the frequency of content accessed and a time in which content is accessed. In the above example (i.e., on Thursday mornings), module 570 may identify and prioritize the television programs "Law and Order" and "Golden Girls" in this order. In another implementation (e.g., on Friday mornings), module 570 may identify and prioritize a different set of content based on information from user profile repository 550 that user device 310 accesses a different set of content on Friday mornings (e.g., the television programs "The Office" at 10 AM, and "Seinfeld" at 11 AM).

Additionally, or alternatively, module 570 may use another rule and/or algorithm to identify and prioritize content based on what user device 310 is currently accessing. For example, module 570 may identify what a user is currently accessing based on information from the content history repository 510 and/or user device 310. In one implementation, module 570 may prioritize the currently accessed content as the top priority.

Additionally, or alternatively, module 570 may use another rule and/or algorithm to identify and prioritize content based on a manually specified content list. For example, the user may interact with module 570, via user device 310, to manually specify information with respect to content in which the user may be interested (or alternatively, content in which the user is not be interested). In one implementation, the user may specify any information with respect to content that may interest him/her (or alternatively, content that may not interest the user). Such details may include content type/name (e.g., television program "Law and Order"), channel number/number (e.g., channel 4, NBC), topic (e.g., comedy, horror, movies, etc), and/or a priority designation (e.g., priority 1 of 10). Module 570 may identify a prioritized list of content based on the user's input, where the prioritized list of content may include priority number, content type/name, and content channel, associated with the content.

Additionally, or alternatively, module 570 may use another rule and/or algorithm to identify and prioritize content based on information from a combination of the frequently accessed content, the currently accessed content, and/or the user's manually specified content. For example, module 570 may identify, based on information from user profile repository 550, that the user frequently accesses the television programs "Law and Order" on Thursday mornings at 10 AM and "Golden Girls" on Thursday mornings at 11 AM. Module 570 may also identify, based on user's manually specified list of content, that the television program "Golden Girls" is listed as priority 1, and the television program "Law and Order" is listed as priority two. In this instance, module 570 may identify and prioritize content as the television program "Golden Girls" and then the television program "Law and Order," even though information from user profile repository 550 shows that the television program "Law and Order" is accessed before the television program "Golden Girls."

It will be apparent that the above illustrates some specific examples for identifying and prioritizing content based on a theoretically unlimited number of rules and/or algorithms. In practice, the user may define any number of rules and/or algorithms which module 570 may use to identify and/or prioritize content. Additionally, or alternatively, module 570 may identify and prioritize content based on some other technique.

Content size identification module 580 may receive/store information identifying an amount of content corresponding to a time period during which user device 310 is anticipated to be outside of WLAN range, based on information from module 560 and module 570. For example, if the identified content is video content (based on information from module 570), then module 580 may determine an amount of content corresponding to a time period during which user device 310 is anticipated to be outside of WLAN range, as identified in module 560. For example, if the time period identified in module 560 is 60 minutes, module 580 may determine the amount of content corresponding to the time period identified in module 560 (i.e., 60 minutes). For example, 60 minutes of content playback may equate to a requirement of 1 gigabyte (GB) of data, or a cache or buffer size of 1 GB. The size of the cache or buffer may depend on the time period during which user device 310 is anticipated to be outside of WLAN range. Additionally, module 580 may determine other factors that may affect the size of the cache or buffer, such as content type, and content quality.

FIGS. 6A-6D are diagrams of an example data structure that may be associated with a user profile 600. In one implementation, user profile 600 may be stored in a memory of user profile server 330. In another implementation, user profile 600 may be stored in a memory separate from, but accessible by, user profile server 330. User profile server 330 may store multiple user profiles 600 associated with one or more users. A user profile 600, associated with one user, may contain different information and/or fields than a user profile 600 associated with another user. A user may be permitted to control what information and/or fields are used in user profile 600.

As shown in FIG. 6A, user profile 600 may include a user identifier (ID) field 610, a device list field 611, a list of user locations field 612, a list of WLANs used/subscribed to field 613, a travel pattern information field 614, a frequently accessed content field 615, a manually specified content field 616, and a prioritized list of content field 617. In another implementation, user profile 600 may include additional fields, fewer fields, different fields, or differently arranged fields.

User profile 600 may be used to identify particular content, as well as to anticipate time periods during which one or more user devices 310, associated with a user, are connected to (or disconnected from) a WLAN. Various devices in environment 300 may use user profile 600 to identify particular content, to identify a particular time during which the particular content is to be transferred to user device 310, and to identify how much of particular content to transfer. In one implementation, the particular time might correspond to when user device 310 is connected to a WLAN.

User ID field 610 may store information that identifies a user with which user profile 600 is associated. For example, the information, identifying the user, may include any string of characters. The character string may be unique to the user, such that no two users have the same character string. In the example shown in FIG. 6A, user ID field 610 may store the character string "lsmith."

Device list field 611 may store information that identifies a list of user devices, such as user devices 310, associated with the user. Each of user devices 310 may be identified based on a name or a string of characters that is unique to that user device 310, such that no two user devices 310 in device list field 611 have the same name or character string. In one implementation, the user may interact with user profile server 330 to provide the names or character strings for user devices 310. In one implementation, user profile server 330 may automatically obtain information regarding user devices 310, associated with the user, based on a registration of user devices 310 with a service provider. In the example shown in FIG. 6A, device list field 611 stores the following information regarding user devices 310: "smart phone," "tablet," "laptop," "desktop," and "DVR."

List of user locations field 612 may store information regarding geographic locations that the user frequents. The geographic location information may include an address, geographic coordinates, or other information that identifies a particular geographic location. In one implementation, the user may provide the geographic location information to user profile server 330. In one implementation, user profile server 330 may obtain the geographic location information from user devices 310 associated with the user. For example, a user device 310 may provide information regarding locations, frequented by the user, to user profile server 330. In the example shown in FIG. 6B, list of user locations field 612 stores the following information regarding locations frequented by the user: "Home," "Work," "Friend's house," "Coffee shop," "Candy store," "LAX," and "DCA."

List of WLANs used or subscribed to field 613, as previously discussed with respect to user WLAN location repository 540, may receive and/or store information identifying WLANs associated with user device 310. In the example shown in FIG. 6A, list of WLANs used/subscribed to field 613 stores the following information identifying WLANs associated with the user: "DCA Airport," "Coffee shop," "Donut shop," "Hotel," "Library," "Bookstore," and "Home."

Travel pattern information field 614, as previously discussed with respect to travel pattern determination module 530, may store information regarding geographic locations and/or times of travel in the context of travel routes frequented by the user.

Figure 6B:

FIG. 6B is an example data structure 650 which may correspond to travel pattern information field 614. As shown in FIG. 6B, data structure 650 may include a start location field, an end location field, start time 1-N fields (where N≥1), and end time 1-N fields. In another implementation, travel pattern information field 614, as previously discussed with respect to travel pattern determination module 530, may store information regarding geographic locations and/or times of travel in the context of travel routes frequented by the user. Some examples of identifying travel pattern information are described above with respect to travel pattern determination module 530. In the example shown in FIG. 6B, data structure 650 stores information for travel routes from a home location to a coffee shop, the coffee shop to a work location, the work location to the home location, the home location to a gym, the gym to the work location, and the work location to the home location.

Returning to FIG. 6A, frequently accessed content field 615, as previously discussed with respect to content history repository 510 and frequently accessed content determination module 520, may store information identifying content history accessed by user device 310. Some examples of identifying frequently accessed content are described above with respect to content history repository 510 and frequently accessed content determination module 520.

FIG. 6C is an example data structure 660, which may correspond to frequently accessed content field 615. As shown in FIG. 6C, data structure 660 may include content name and days/times frequently accessed. In another implementation, frequently accessed content field 615, as previously discussed with respect to content history repository 510 and frequently accessed content determination module 520, may receive and/or store information identifying content accessed by user device 310 and may receive/store information regarding dates and/or times that the content was accessed by user device 310. In the example shown in FIG. 6C, data structure 660 stores information regarding frequently accessed content, or television programs "Law and Order," "Golden Girls," "Seinfeld," and "The Office."

Returning to FIG. 6A, manually specified content field 616, as previously discussed with respect to content identification/prioritization module 570, may receive and/or store a prioritized list of content that a user specifies, via user device 310.

Prioritized content list field 617, as previously discussed with respect to content identification/prioritization module 570, may receive and/or store a prioritized list of content based on a variety of rules and/or algorithms. For example, module 570 may use rules and/or algorithms to identify and prioritize content based on frequently accessed content, content currently being accessed by user device 310, and/or a manually specified list of content. Prioritized content list field 617 may receive and/or store the identified and prioritized content from module 570. In the example shown in FIG. 6A, prioritized content list field 617 stores the following information: the television programs "Golden Girls," "Law and Order," "The Office," and "Seinfeld."

FIG. 6D is an example data structure 670, which may correspond to prioritized content list 617. In another implementation data structure 670, as previously discussed with respect to content identification/prioritization module 570, may receive and/or store a prioritized list of content associated with a user. As shown in FIG. 6D, data structure 670 stores information regarding content, or television programs "Golden Girls," "Law and Order," "The Office," "Seinfeld," "Jeopardy," and "Judge Judy."

While the user profile 600 is represented in FIGS. 6A-6D as tables with rows and columns, in practice, user profile 600 may include any type of data structure, such as a linked list, a tree, a hash table, a database, or any other type of data structure. User profile 600 may include information generated or provided by user profile server 330, such as one or more functional components described above with respect to FIG. 5. Additionally, or alternatively, user profile 600 may include information provided from any other source, such as information provided by one or more users devices 310, and/or information automatically provided by one or more other devices in environment 300.

Figure 7:
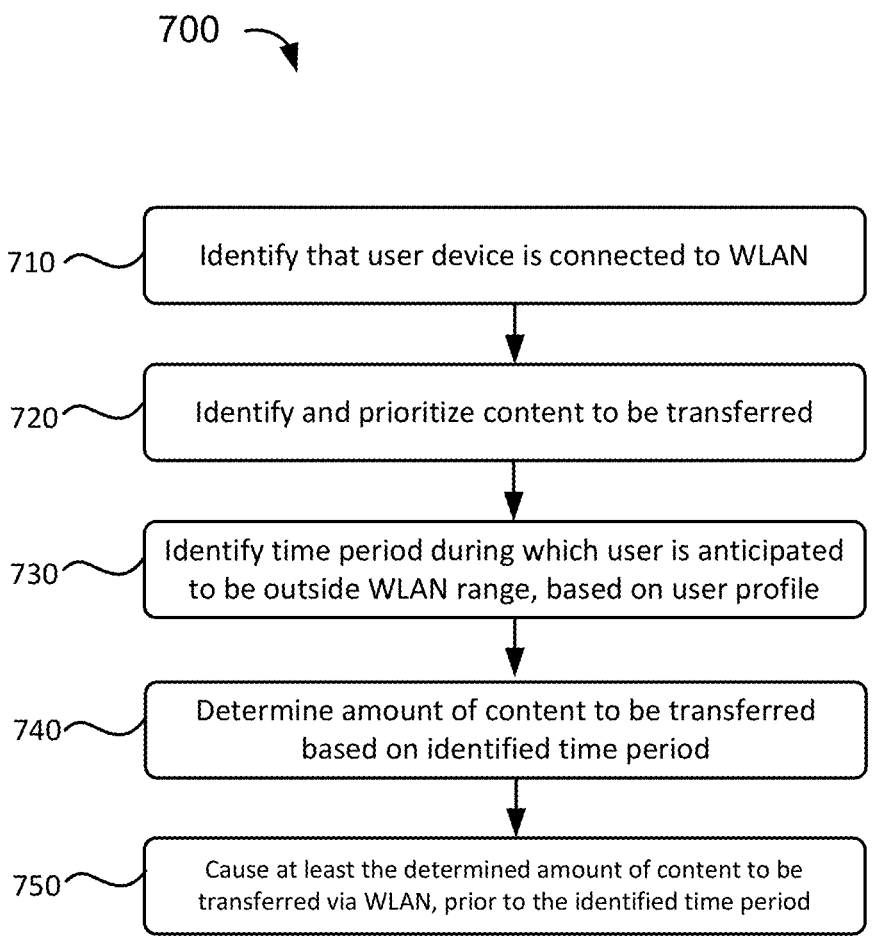
FIG. 7 is a flowchart of an example process for reducing cellular network usage.

FIG. 7 is a flowchart of an example process 700 for reducing cellular network usage. In one implementation, process 700 may be performed by one or more servers 320-360, such as user profile server 330 and/or content distribution server 360. In another implementation, some or all of process 700 may be performed by another device, such as user device 310, or a set of devices including or excluding servers 320-360.

Process 700 may be used, for example, to transfer content that a user may be interested in to a user device 310, at a particular time. The particular time may correspond to a time period during which user device 310 is connected to a WLAN, and prior to a time when user device 310 disconnects from the WLAN.

As shown in FIG. 7, process 700 may include determining that a user device is connected to a WLAN (block 710). For example, user profile server 330 may determine whether a user device, such as user device 310, is connected to a WLAN. User profile server 330 may make this determination based on a comparison of the location of user device 310 to a location of WLAN locations as indicated by information stored by user WLAN location repository 540 and/or WLAN location server 340. Additionally, or alternatively, user profile server 330 may determine that user device 310 is connected to a WLAN, based on information received from user device 310.

Process 700 may further include identifying and prioritizing content to be transferred (block 720). Some examples of identifying and prioritizing content are described above with respect to content identification/prioritization module 570 and/or prioritized content list field 617. For example, user profile server 330 may identify and/or prioritize content based on information stored in prioritized content list field 617. Additionally, or alternatively, user profile server 330 may use any other technique to identify and prioritize content.

Process 700 may further include identifying a time period during which the user is anticipated to be outside of WLAN range, based on user profile 600 (block 730). Some examples of identifying a time period during which the user is anticipated to be outside of WLAN range are previously discussed with respect to time period identification module 560. For example, user profile server 330 may identify one or more time periods during which a user device 310 is anticipated to be outside of WLAN range, based on information from user profile 600 and/or time period identification module 560. These time periods may correspond to a user's travel pattern.

Process 700 may further include determining an amount of content to be transferred based on the identified time period (block 740). For example, as previously discussed with respect to content size identification module 580, user profile server 330 may identify an amount of content corresponding to a time period during which user device 310 is anticipated to be outside of WLAN range, based on information from time period identification module 560 and/or content identification module 570.

Process 700 may further include causing at least the determined amount of the content to be transferred via the WLAN, based on the identified time period and the determined amount of content (block 750). For example, user profile server 330 may issue instructions to content distribution server 360 to transfer at least the determined amount of content to user device 310, before the identified time period.

The system and/or method described with respect to process 700 may be used, for example, when a user is accessing content from user device 310 while user device 310 is currently connected to a WLAN (e.g., in a user's home). User profile server 330, based on information from content identification/prioritization module 570, may identify content that the user may be interested in (e.g., content the user frequently accesses, content the user is currently accessing, or content the user has manually specified), and may anticipate that the user may wish to access the identified content after the user begins travel, during which user device 310 is anticipated to be outside of WLAN range. In anticipation of this activity, user profile server 330 may cause the identified content to be transferred to user device 310, prior to the time period identified. Further, user profile server 330 may cause at least an amount of content to transfer to user device 310, where the amount of content corresponds to a time period during which user device 310 is anticipated to be outside of WLAN range. Process 700 may ensure that the identified content is available on user device 310, without user device 310 needing to communicate with content distribution server 360 via a cellular network.

Figure 8A:
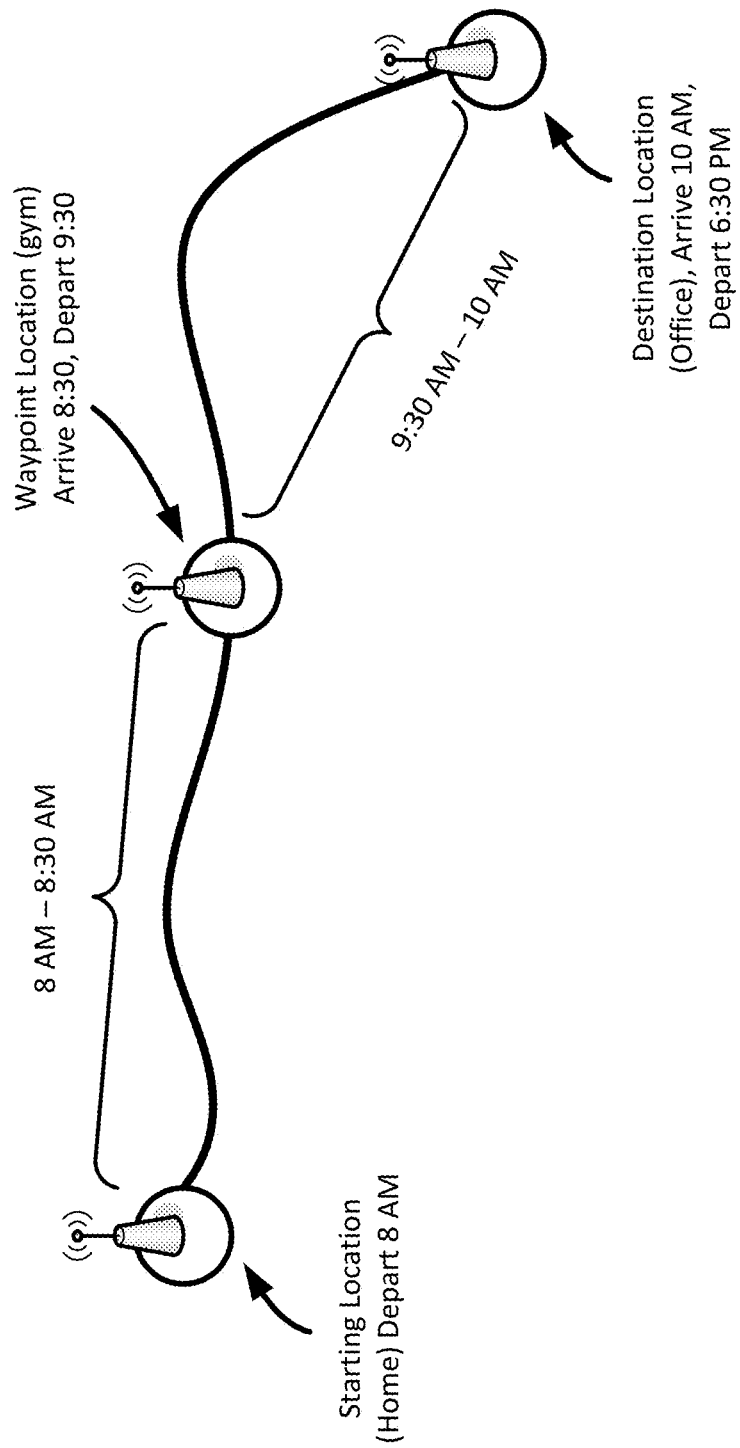
FIGS. 8A-8C are diagrams that illustrate example implementations described herein.
Figure 8B:
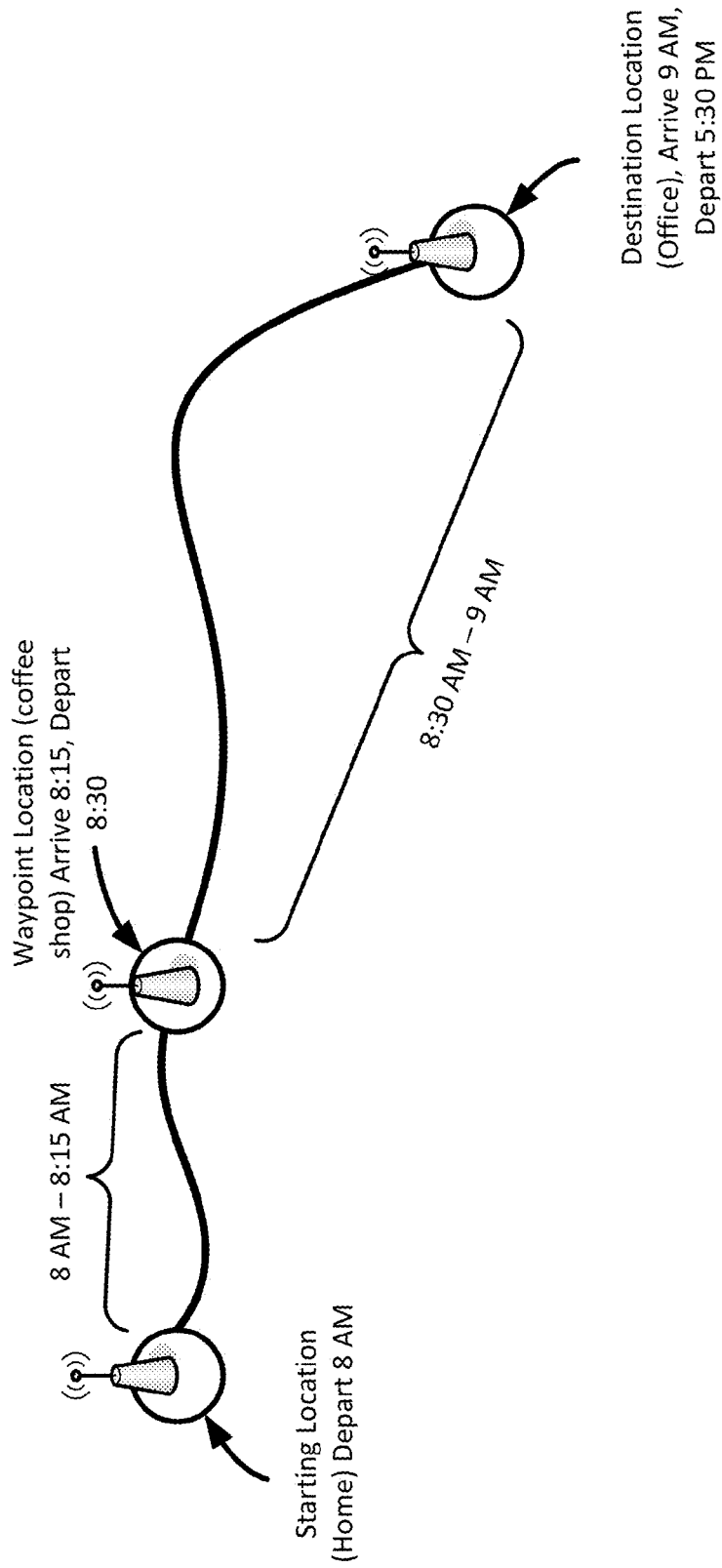
Figure 8C:
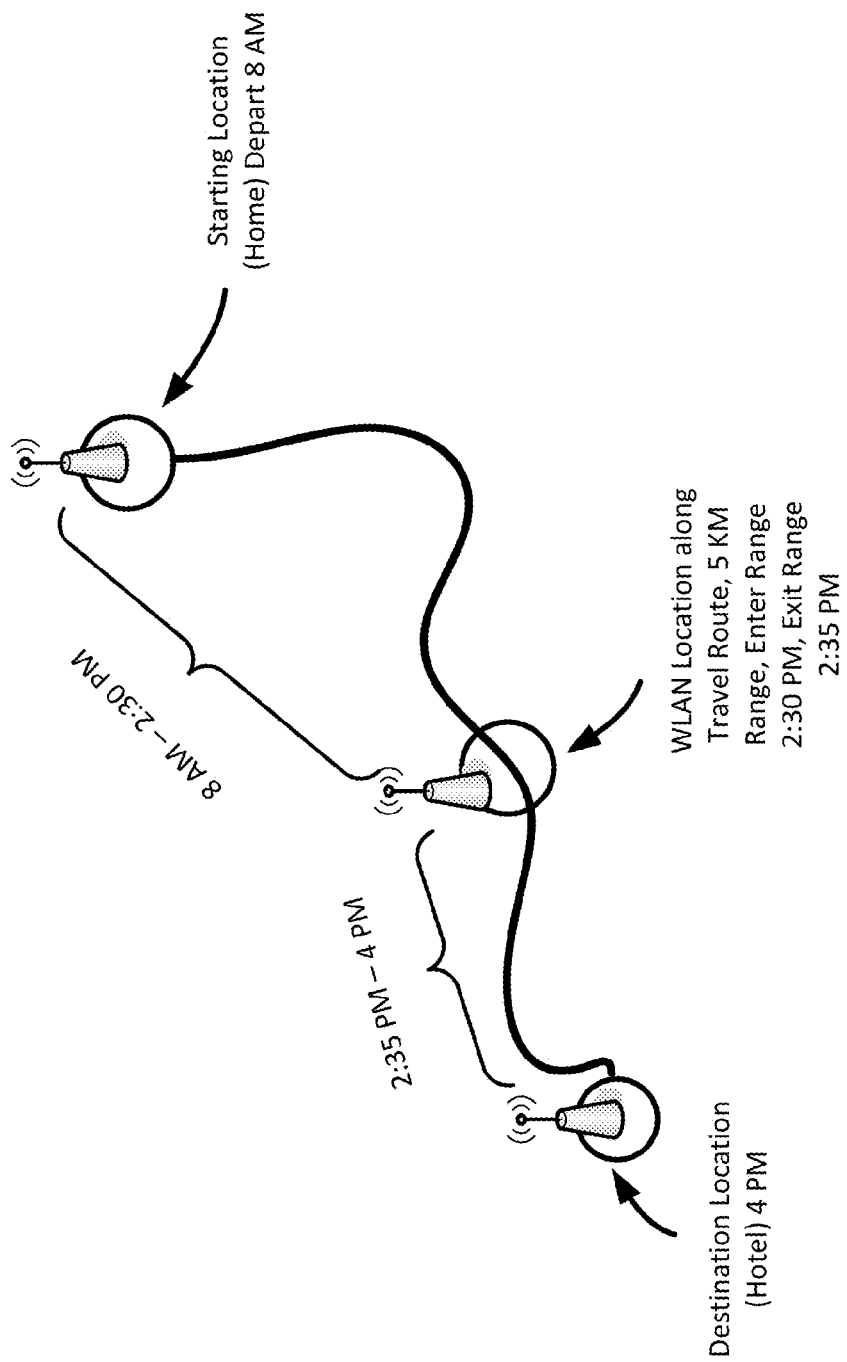

FIGS. 8A-8C are diagrams describing example implementations of determining a time period during which user device 310, associated with the user, is anticipated to be outside of WLAN range. As discussed above, with respect to time period identification module 560, user profile server 330 may use information from module 560 to identify one or more time periods during which user device 310, associated with the user, is anticipated to be outside of WLAN range.

For example, as shown in FIG. 8A, user profile server 330 may determine, based on information from time period identification module 560, that on particular days of the week (e.g., Mondays, Wednesdays, and Fridays), a user, associated with user device 310, exits WLAN range associated with a starting location (e.g., the user's home), at 8 AM. User profile server 330 may also determine, based on information from time period identification module 560, that user device 310 enters WLAN range associated with a waypoint location (e.g., the gym) at 8:30 AM. In this instance, user profile server 330, based on time period identification module 560, may identify a time period of 8 AM to 8:30 AM where user device 310 is anticipated to be outside of WLAN range.

In a further implementation, user profile server 330 may determine, based on information from time period identification module 560, that user device 310 exists WLAN range associated with the waypoint location (i.e., the gym) at 9:30 am, and enters WLAN range associated with a destination location (e.g., the user's office), at 10 AM. In this instance, user profile server 330, based on information from time period identification module 560, may identify a time period of 9:30 AM to 10 AM where user device 310 is anticipated to be outside of WLAN range.

As shown in FIG. 8B, user profile server 330 may determine, based on information from time period identification module 560, that on particular days of the week (e.g., Tuesdays and Thursdays), user device 310 leaves WLAN range associated with a starting location (e.g., the user's home), at 8 AM. User profile server 330, based on information from time period identification module 560, may also determine that user device 310 enters WLAN range associated with a waypoint location (e.g., the coffee shop) at 8:15 AM. In this instance, user profile server 330, based on information from time period identification module 560, may identify a time period of 8 AM to 8:15 AM where user device 310 is anticipated to be outside of WLAN range. Further, user profile server 330, based on information from time period identification module 560, determines that user device 310 exits WLAN range associated with the waypoint location (i.e., the coffee shop) at 8:30 AM, and enters WLAN range associated with a destination location (e.g., the user's office), at 9 AM. In this instance, user profile server 330, based on information from time period identification module 560, may identify a time period of 8:30 AM to 9 AM where user device 310 is anticipated to be outside of WLAN range.

As shown in FIG. 8C, user profile server 330 may determine, based on information from time period identification module 560, that user device 310 is outside WLAN range, while user device 310 is moving. For example, suppose a WLAN is located along the user's travel route, and has a range of 5 kilometers. User profile server 330, based on time period identification module 560, may identify that user device 310 may enter WLAN range for a period of 5 minutes. As shown in FIG. 8C, user device 310 may enter WLAN range at 2:30 PM, and exit WLAN range at 2:35 PM. In this instance, user profile server 330, based on time period identification module 560, may identify a time period of 2:30 PM to 2:35 PM where user device 310 is in WLAN range.

It will be apparent that the above illustrates some specific examples for identifying time periods during which user device 310 is anticipated to be outside of WLAN range. User profile server 330 may identify time periods during which user device 310 is anticipated to be outside of WLAN range based on a theoretically unlimited number of possibilities, with respect to a user's travel pattern. User profile 330 may also identify time periods using any other technique.

FIGS. 8A-8C may represent examples that may identify time periods when user device 310 is anticipated to be outside of WLAN range. Examples shown in FIGS. 8A-8C may be used in the context of allowing user device 310 to communicate with content distribution server 360 via a WLAN. In some implementations, the examples shown in FIGS. 8A-8C may ensure that content is available on user device 310, without user device 310 needing to communicate with content distribution server 360 via a cellular network. The content may be available on user device 310, for example, to allow a user, associated with user device 310, to access content while serving as a passenger on a traveling route. Additionally, or alternatively, the content may be available to the user, associated with user device 310, while the user is carrying out another activity (e.g., the user may be accessing content while exercising at a gym, or while on a designated break period at their office location). No implementations described herein are intended to be used in violation of traffic laws with respect to operating a motor vehicle while using user device 310.

Figure 9:
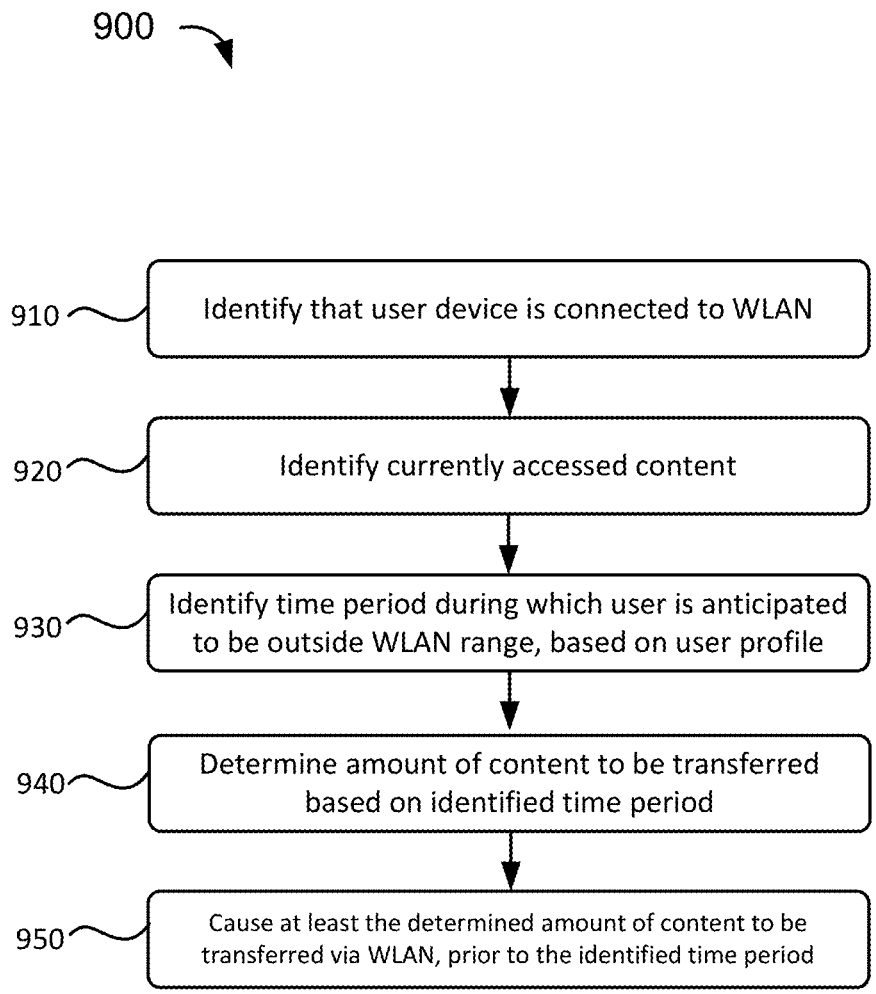
FIG. 9 is a flowchart of an example process for reducing cellular network usage.

FIG. 9 is a flowchart of an example process 900 for reducing cellular network usage. In one implementation, process 900 may be performed by one or more components of user profile server 330, such as processing unit 405 of user profile server 330. In one implementation, one or more blocks of process 900 may be performed by one or more components of another device (e.g., one or more of servers 320-360), or a group of devices including or excluding user profile server 330. Process 900 will be described with corresponding references to examples illustrated in FIGS. 10A-10B.

Process 900 may be used, for example, to transfer content, that a user is currently interested in, (such as content currently being accessed from user device 310) to user device 310. Content distribution server 360 may transfer content while user device 310 is in range of the WLAN, and prior to a time when a user associated with user device 310 begins a travel routine, where a WLAN connection may be unavailable.

As shown in FIG. 9, process 900 may include determining that a user device is connected to a WLAN (block 910). For example, user profile server 330 may determine whether a user device, such as user device 310, is connected to a WLAN. User profile server 330 may make this determination based on a comparison of the location of user device 310 to a location of WLAN locations as indicated by information stored by user WLAN location repository 540 and/or WLAN location server 340. Additionally, or alternatively, user profile server 330 may determine if user device 310 is connected to a WLAN based on information received from user device 310.

Process 900 may also include identifying currently accessed content (block 920). Some examples of identifying currently accessed content are described above with respect to content identification/prioritization module 570. For example, user profile server 330 may identify currently accessed content based on information from content history repository 510, and/or user device 310 . . .

Figure 10A:
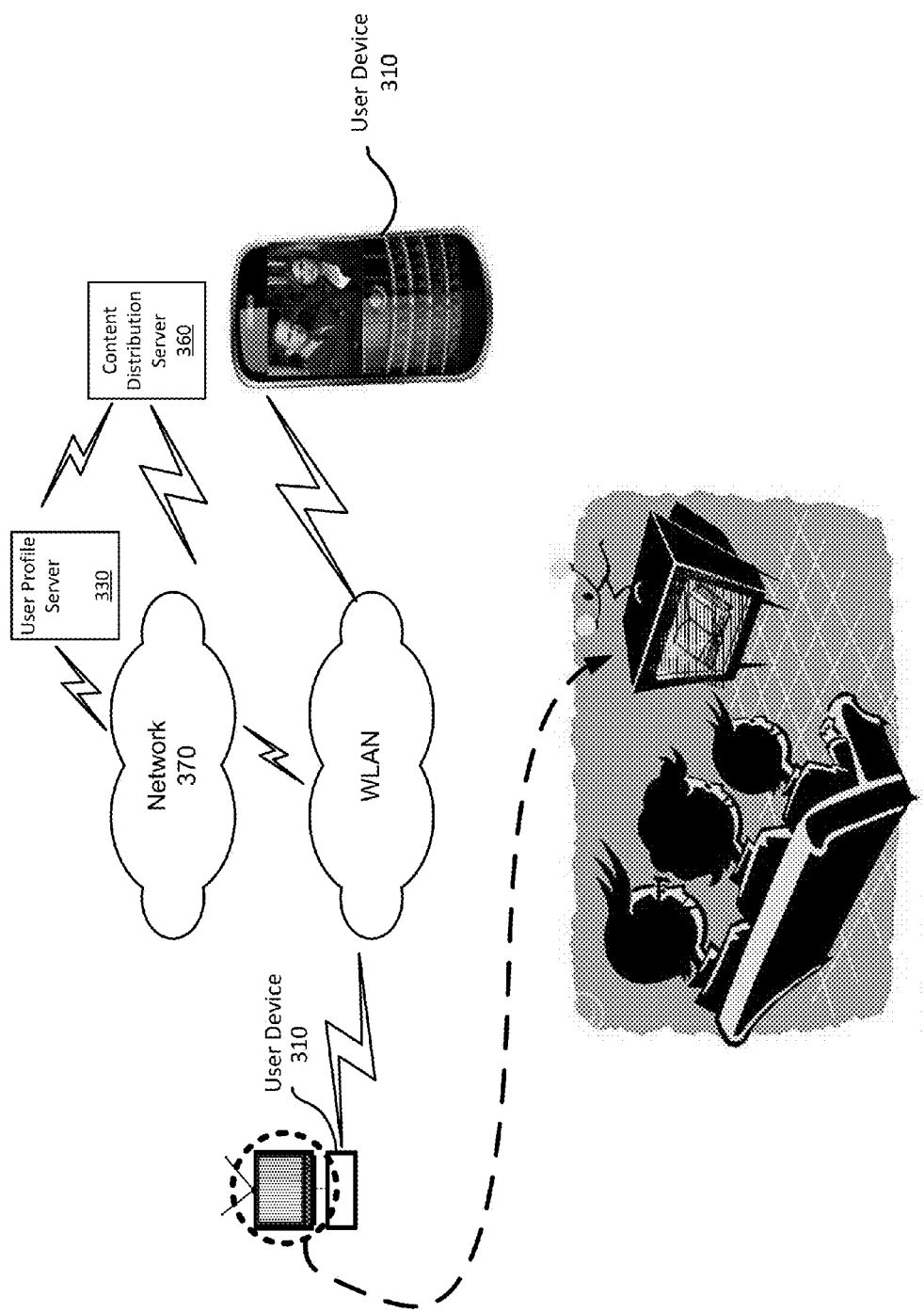
FIG. 10A-10B are diagrams that illustrate an overview of an example implementation of the example process shown in FIG. 9.

For example, as shown in FIG. 10A, assume that a user is currently accessing the television program "Law and Order" on user device 310 (e.g., a client device, such as set top box connected to a television). User profile server 330 may identify that the user is currently accessing the television program "Law and Order." For example, user profile server 330 may receive information from user device 310, with regard to content currently being accessed.

Process 900 may include identifying a time period during which the user is anticipated to be outside of WLAN range, based on user profile 600 (block 930). Some examples of identifying a time period during which the user is anticipated to be outside of WLAN range are previously discussed with respect to time period identification module 560. For example, user profile server 330 may identify one or more time periods during which a user device 310, associated with the user, is anticipated to be outside of WLAN range, based on information from user profile 600 and/or time period identification module 560. These time periods may correspond to a user's travel pattern. Additional examples of identifying a time period during which the user is anticipated to be outside of WLAN range are previously discussed with respect to FIGS. 8A-8C.

Process 900 may also include determining an amount of content to be transferred based on the identified time period (block 940). For example, as previously discussed with respect to content size identification module 580, user profile server 330 may identify an amount of content corresponding to a time period during which user device 310 is anticipated to be outside WLAN range, based on information from time period identification module 560 and content identification module 570.

Process 900 may further include causing at least the determined amount of content to be transferred via the WLAN, prior to the identified time period (block 950). For example, user profile server 330 may issue instructions to content distribution server 360 to transfer at least the amount of identified content to user device 310 before the identified time period.

Figure 10B:
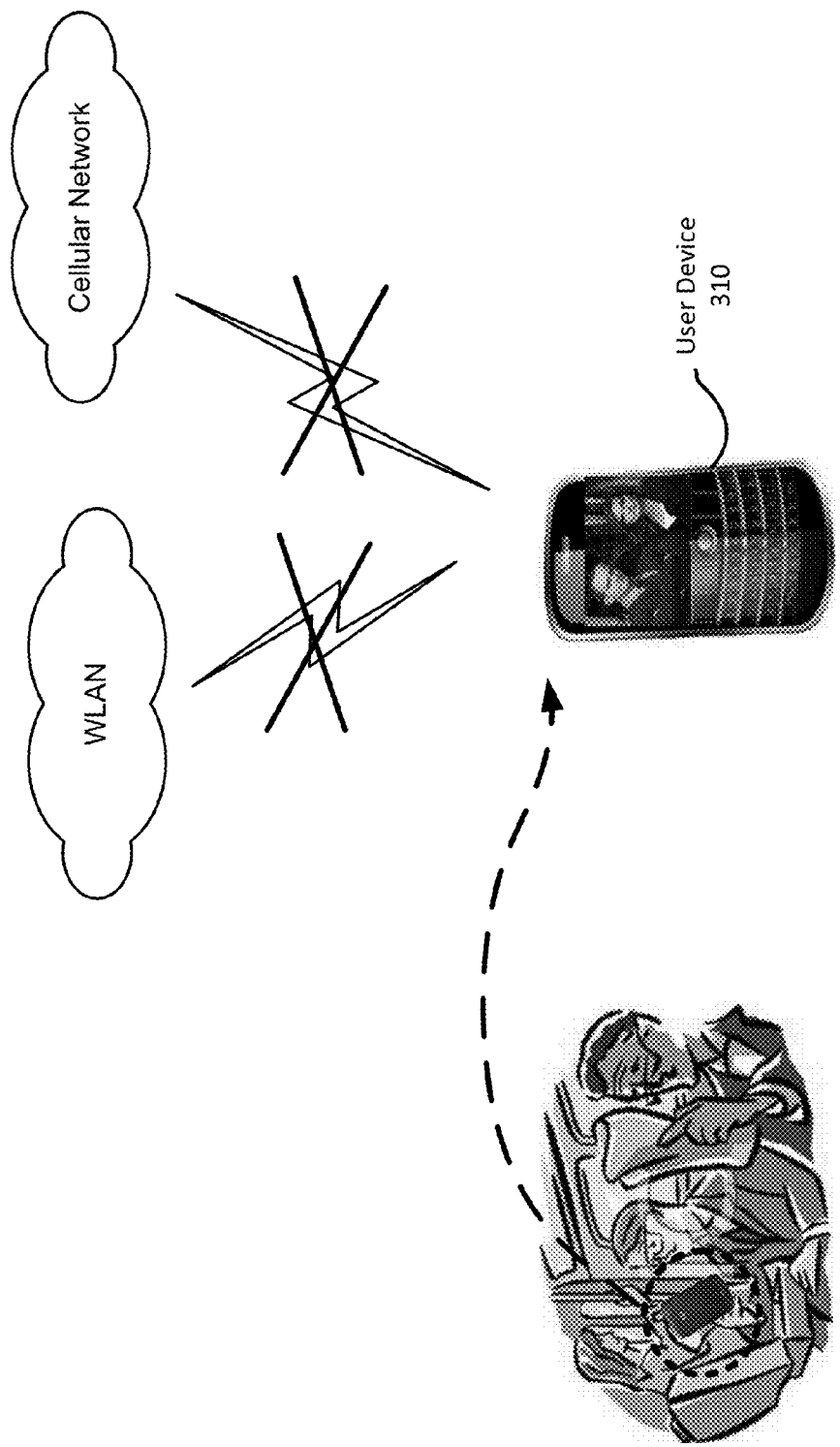

As shown in FIG. 10B, upon the user's departure from the user's current location, user device 310 may exit the range of the WLAN. The user, associated with user device 310, may continue to access the particular content without needing to connect user device 310 to a cellular network to communicate with content distribution server 360.

The system/method described in process 900 may be used, for example, when a user is currently accessing content from user device 310. User profile server 330 may identify content that the user is currently accessing, but may not have finished, as the identified content (block 920). User profile server 330 may anticipate, based on data from user profile repository 550, that the user may wish to continue to access the particular content from another user device 310 after the user begins a routine commute. In anticipation of this activity, user profile server 330 may cause content distribution server 360 to automatically transfer the identified content to user device 310 via the WLAN, prior to the identified time period (block 950). The identified time period may correspond to a user's travel pattern, where they may remove user device 310, associated with the user, from WLAN connection range. As a result, the particular content is available on user device 310 without user device 310 needing to communicate with content distribution server 360 via a cellular network.

Figure 11:
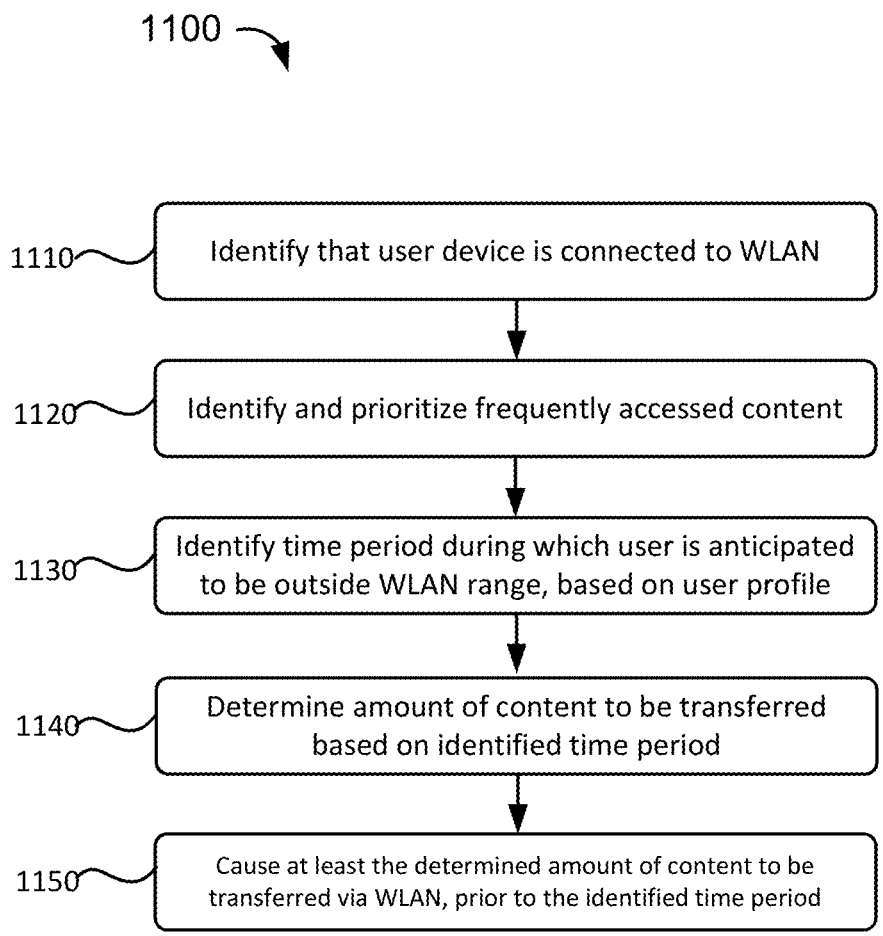
FIG. 11 is a flowchart of an example process for reducing cellular network usage.

FIG. 11 is a flowchart of an example process for reducing cellular network usage. In one implementation, process 1100 may be performed by one or more components of user profile server 330, such as processing unit 405 of user profile server 330. In one implementation, one or more blocks of process 1100 may be performed by one or more components of another device (e.g., one or more of servers 320-360), or a group of devices including or excluding user profile server 330. Process 1100 will be described with corresponding references to examples illustrated in FIGS. 12A-12B.

Figure 12A:
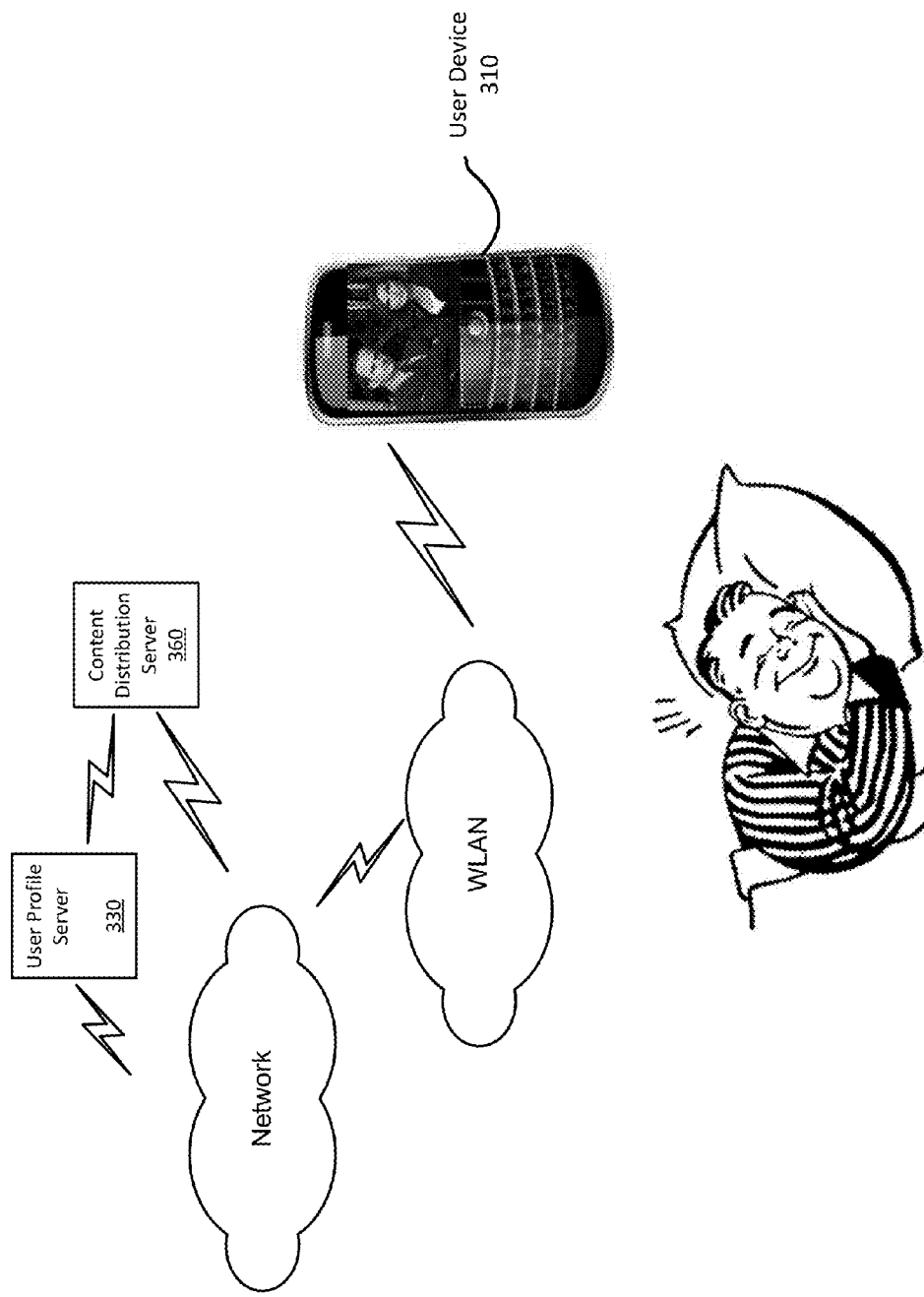
FIG. 12A-12B are diagrams that illustrate an overview of an example implementation of the example process shown in FIG. 11.
Figure 12B:
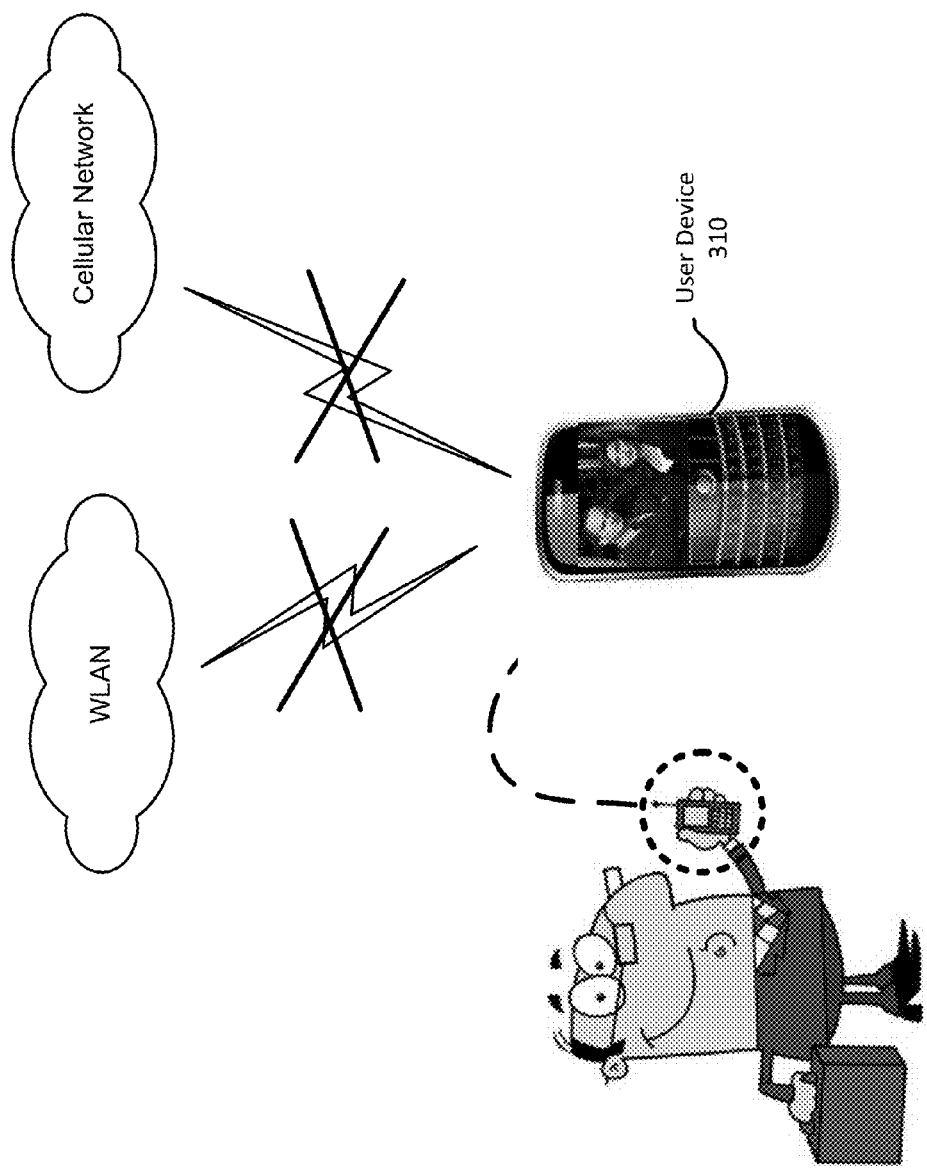

Process 1100 may be used, for example, to transfer content that a user may be interested in (e.g., content that is frequently accessed from user devices 310 associated with the user, or content that the user has manually specified). As shown in FIG. 12A, assume that user device 310 is in an idle state, such as at night time when user device 310 is charging. User profile server 330 may cause content distribution server 360 to transfer content to user device 310 via a WLAN, prior to when a user associated with user device 310 may remove user device 310 from WLAN range. As shown in FIG. 12B, the content is available on user device 310, without user device 310 needing to communicate with content distribution server 360 via a cellular network.

As shown in FIG. 11, process 1100 may include determining that a user device is connected to a WLAN (block 1110). For example, user profile server 330 may determine whether a user device, such as user device 310, is connected to a WLAN. User profile server 330 may make this determination based on a comparison of the location of user device 310 to WLAN locations as indicated by information stored by user WLAN location repository 540 and/or WLAN location server 340. Additionally, or alternatively, user profile server 330 may determine that user device 310 is connected to a WLAN, based on information received from user device 310.

Process 1100 may also include identifying and prioritizing frequently accessed content (block 1120). Some examples of identifying and prioritizing frequently accessed content are described above with respect to content identification/prioritization module 570. For example, user profile server 330 may identify frequently accessed content from content history repository 510, and/or frequently accessed content field 615. In one implementation, user profile server 330 may determine, based on user profile repository 550, that a user frequently accesses the television program "Law and Order" on Thursday mornings at 10 AM, and frequently accesses the television program "Golden Girls" on Thursday mornings at 11 AM. In this instance, user profile server 330 may identify and prioritize content as the first priority being the television program "Law and Order" and the second priority being the television program "Golden Girls." As shown in FIG. 12A, assume that user profile server 330 identifies the frequently accessed content as the television program "Law and Order."

Process 1100 may also include identifying a time period during which the user is anticipated to be outside of WLAN range, based on user profile 600 (block 1130). Some examples of identifying a time period during which the user is anticipated to be outside of WLAN range are previously discussed with respect to time period identification module 560. For example, user profile server 330 may identify one or more time periods during which user device 310, associated with the user, is anticipated to be outside of WLAN range. These time periods may correspond to a user's travel pattern. Additional examples of identifying a time period during which the user is anticipated to be outside of WLAN range are previously discussed with respect to FIGS. 8A-8C.

In another implementation, process 1100 may further include determining an amount of content to be transferred based on the identified time period (block 1140). For example, as previously discussed with respect to content size identification module 580, user profile server 330 may identify an amount of content corresponding to a time period during which user device 310 is anticipated to be outside of WLAN range, based on information from time period identification module 560 and/or content identification module 570.

Process 1100 may further include causing at least the determined amount of content to be transferred via the WLAN, prior to the identified time period (block 1150). For example, user profile server 330 may issue instructions to content distribution server 360 to transfer at least the determined amount of content to user device 310, before the identified time period.

As shown in FIG. 12B, the content is available on user device 310, after the user has removed user device 310 from WLAN range. Further, the content is available on user device 310, without user device 310 needing to communicate with content distribution server 360 via a cellular network.

Process 1100 may ensure that high priority content is transferred before low priority content, in case user device 310 is removed from the WLAN range, or if user device 310 does not have sufficient storage to store more than a certain amount of content.

The system/method as described by process 1100 may be used, for example, when the user device 310 is currently connected to a WLAN while in an idle state, such as in the night hours when user device 310 is charging or idle. As shown in FIG. 12A, user profile server 330 may anticipate that the user may likely access content from user device 310 in the morning hours, based on information from user profile repository 550. In anticipation of this activity, user profile server 330 may identify the content, and cause content distribution server 360 to transfer the identified content to user device 310, prior to the user starting his/her day during which user device 310 is anticipated to be outside of WLAN connection range. As shown in FIG. 12B, the content is available on the user device 310 without needing to communicate with content distribution server 360 via a cellular network.

Figure 13:
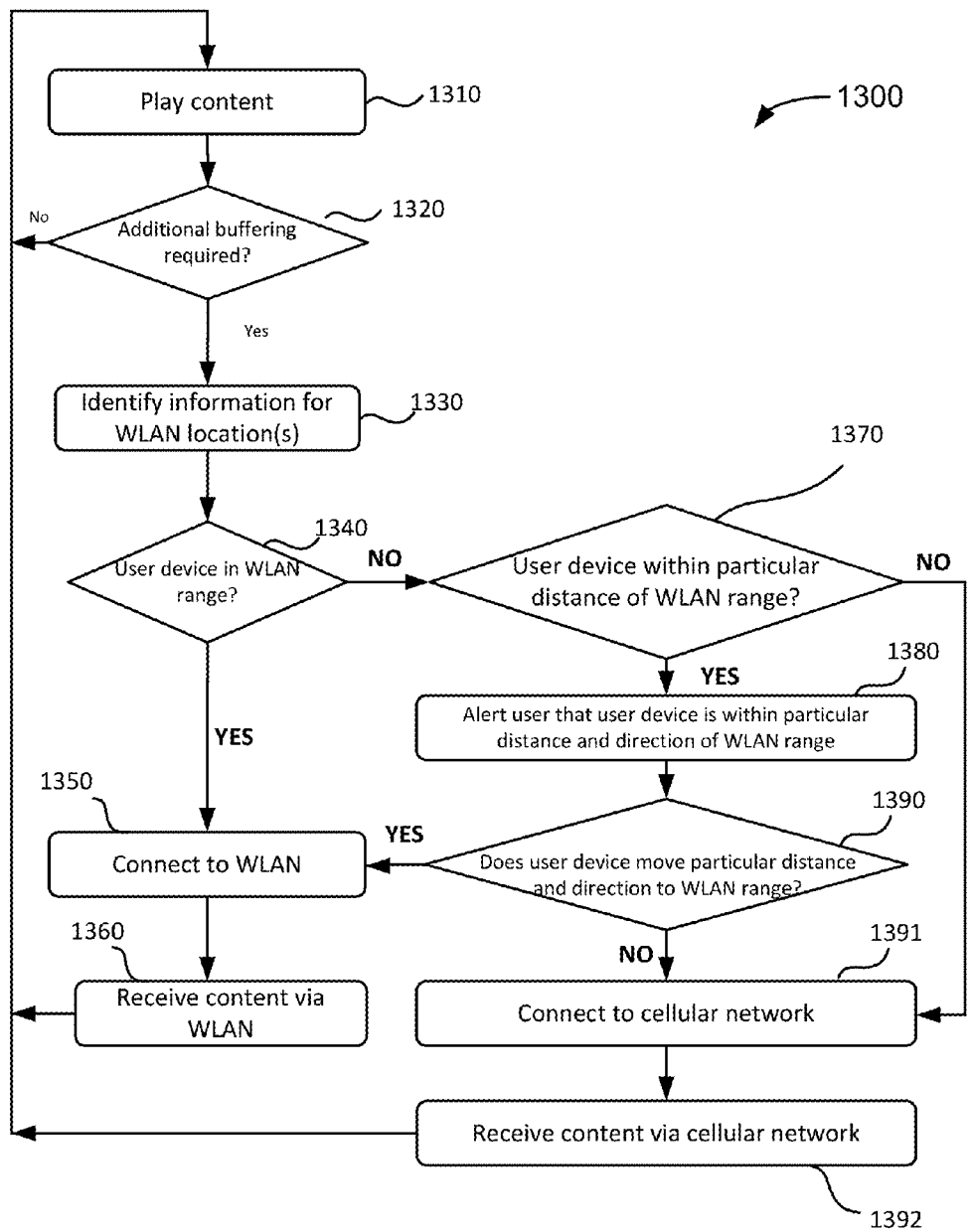
FIG. 13 is a flowchart of an example process for reducing cellular network usage.

FIG. 13 is a flowchart of an example process for reducing cellular network usage. In one implementation, process 1300 may be performed by one or more components of user device 310, such as processing unit 405 of user device 310. In one implementation, one or more blocks of process 1300 may be performed by one or more components of another device (e.g., one or more of servers 320-360), or a group of devices including or excluding user device 310.

Process 1300 may include playing content (block 1310). For example, a user may instruct user device 310 to play content by selecting the content from a list of content stored on user device 310. When instructed, user device 310 may output the content on, for example, a display associated with user device 310.

Process 1300 may include determining if additional buffering is required (block 1320). For example, assume that user device 310 is playing content and the amount of data, associated with the content, stored on user device 310 is sufficient to play the content in its entirety. In this instance, user device 310 may determine that additional buffering is not required (block 1320-NO). In this case, process 1300 may further include playing the content (block 1310). For example, user device 310 may play the content, as described above.

If, on the other hand, the amount of data stored on user device 310 is insufficient to play the content in its entirety, user device 310 may determine that additional buffering is required (block 1320-YES). In this case, process 1300 may include identifying information for WLAN locations (block 1330). For example, user device 310 may receive information for WLAN locations from WLAN location repository 540 and/or WLAN location server 340.

Process 1300 may further include determining if user device 310 is in WLAN range (block 1340). For example, user device 310 may determine if user device 310 is in WLAN range, based on a comparison of the location of user device 310 to the WLAN locations as indicated by information stored by WLAN location repository 540 and/or WLAN location server 340. Additionally, or alternatively, user device 310 may determine if user device 310 is in WLAN range if user device 310 detects a signal from a WLAN.

If user device 310 is in WLAN range, (block 1340-YES) then process 1300 may include connecting to the WLAN (block 1350). For example, user device 310 may exchange signals with an access point, associated with the WLAN, to connect to the WLAN.

Process 1300 may further include receiving content via the WLAN (block 1360). For example, user device 310 may communicate with content distribution server 360 via the WLAN to receive content. Process 1300 may further include playing the content (block 1310), as described above.

If, on the other hand, user device 310 is not within WLAN range (block 1340-NO), then process 1300 may include determining if user device 310 is within a particular distance of WLAN range (block 1370). For example user device 310 may compare the WLAN locations, obtained from WLAN location server 340 and/or WLAN location repository 540, with the location of user device 310 to determine whether user device 310 is located within a threshold distance of WLAN range.

If user device 310 is not within a particular distance of WLAN range (block 1370-NO), process 1300 may include connecting to a cellular network (block 1391). For example, user device 310 may exchange signals with an access point, associated with the cellular network to connect to the cellular network. User device 310 may connect to the cellular network to communicate with content distribution server 360 via the cellular network.

Process 1300 may further include receiving content via the cellular network (block 1392). For example, user device 310 may communicate with content distribution server 360 to receive content via the cellular network. Process 1300 may further include playing the content (block 1310), as described above.

If, on the other hand, user device 310 is within a particular distance of WLAN range (block 1370-YES), process 1300 may include alerting the user that user device 310 is within a particular distance and direction of WLAN range (block 1380). For example, user device 310 may display a message alerting the user that user device 310 is within a particular distance and direction of WLAN range. User device 310 may also provide the user with directions to the location of the WLAN.

Process 1300 may also include determining if user device 310 moves the particular distance and direction to WLAN range (block 1390). For example, user device 310 may determine if the user moves user device 310 the particular distance and direction to WLAN range, as determined by a location determination unit in user device 310. Additionally, or alternatively, user device 310 may determine if user device 310 moves the particular distance and direction to the WLAN if user device 310 detects a WLAN signal. If user device 310 moves the particular distance and direction to the WLAN (block 1390-YES), process 1300 may include connecting to the WLAN (block 1350). For example, user device 310 may connect to the WLAN, as described above.

Process 1300 may further include receiving content via the WLAN (block 1360). For example, user device 310 may communicate with content distribution server 360 to receive content via the WLAN. Process 1300 may further include playing the content (block 1310), as described above.

If, on the other hand, the user does not move the particular distance and direction to the WLAN (block 1390-NO), process 1300 may include connecting to a cellular network (block 1391). For example, user device 310 may connect to the cellular network, as described above.

Process 1300 may further include receiving content via the cellular network (block 1392). For example, user device 310 may communicate with content distribution server 360 to receive content from via the cellular network. Process 1300 may further include playing the content (block 1310), as described above.

Process 1300 may ensure that content distribution server 360 can communicate with user device 310 to ensure uninterrupted content playback, while preferring the use of WLANs to the use of cellular networks. In one implementation, process 1300 may utilize WLANs along a traveling route of user device 310, thereby reducing cellular network traffic.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 7, 9, 11, and 13, the order of the blocks may be modified in other implementations. Further, non-dependent blocks may be performed in parallel.

It will be apparent that different examples of the description provided above may be implemented in many different forms of software, firmware, and hardware in the implementations illustrated in the figures. The actual software code or specialized control hardware used to implement these examples is not limiting of the possible implementations. Thus, the operation and behavior of these examples were described without reference to the specific software code--it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   storing, by one or more devices, a user profile associated with a user, the user profile identifying:
   a first time corresponding to when a user device, of one or more user devices associated with the user, moves from a first location, associated with a local area network, to a second location that is not associated with the local area network,
   a time period corresponding to a quantity of time that the user device is anticipated to be outside the local area network, and
   a list of content accessed by the one or more user devices;
   identifying, by the one or more devices, particular content based on the list of content in the user profile;
   determining, by the one or more devices, an amount of the particular content to transfer based on the time period; and
   causing, by the one or more devices and prior to the first time, at least the amount of the particular content to automatically transfer to the user device via the local area network.

2. The method of claim 1, further comprising:
   determining the first time based on a pattern of movement of the user device, with respect to a first geographic location; and
   storing information identifying the first time in the user profile.

3. The method of claim 2, further comprising:
   determining a second time based on the pattern of movement of the user device with respect to a second geographic location;
   determining the time period based on a difference between the first time and the second time; and
   storing information identifying the time period in the user profile.

4. The method of claim 1, further comprising:
   determining frequently accessed content associated with the user device; and
   storing information regarding the frequently accessed content in the list of content in the user profile.

5. The method of claim 1, further comprising:
   determining content currently accessed by the user device; and
   storing information regarding the currently accessed content in the list of content in the user profile.

6. The method of claim 1, further comprising:
   receiving the list of content from the user device; and
   storing information regarding the list of content in the user profile.

7. The method of claim 1, further comprising:
   sending information identifying a geographic location of at least one local area network to the user device,
   the user device using the information identifying the geographic location to connect to the at least one local area network.

8. A system comprising:
   one more devices to:
   store a user profile associated with a user, the user profile identifying:
   a first time corresponding to when a user device, of one or more user devices associated with the user, moves from a first location, associated with a local area network, to a second location that is not associated with the local area network,
   a time period corresponding to a quantity of time that the user device is anticipated to be outside the local area network, and
   particular content that was accessed by the one or more user devices;
   determine an amount of the particular content to transfer based on the time period; and
   cause, prior to the first time, at least the amount of the particular content to automatically transfer to the user device via the local area network.

9. The system of claim 8, where the particular content is determined based on content accessed greater than a threshold quantity of times within a particular time period.

10. The system of claim 8, where the one or more devices are further to:
    send information identifying a geographic location of at least one local area network to the user device,
    the user device using the information identifying the geographic location to connect to the at least one local area network.

11. A non-transitory computer-readable medium storing instructions, the instructions comprising:
    a plurality of instructions which, when executed by one or more processors, cause the one or more processors to:
    receive input to define a user profile, associated with a user, where the user profile identifies:
    a first time corresponding to when a user device, of one or more user devices associated with the user, moves from a first location, associated with a local area network, to a second location that is not associated with the local area network,
    a time period corresponding to a quantity of time that the user device is anticipated to be outside the local area network, and
    particular content that was accessed or identified by the one or more user devices;
    determine an amount of particular content to transfer based on the time period; and
    cause, prior to the first time, at least the amount of the particular content to automatically transfer to the user device via the local area network.

12. The non-transitory computer-readable medium of claim 11, where the plurality of instructions further cause the one or more processors to:
    generate and prioritize a list of content based on content currently being accessed by the one or more user devices and content accessed by the one or more devices greater than a threshold quantity of times within a particular time period; and
    identify the particular content based on the list of content.

13. The non-transitory computer-readable medium of claim 11, where the plurality of instructions further cause the one or more processors to-determine
    the first time based on a pattern of movement of the user device with respect to a first geographic location.

14. The non-transitory computer-readable medium of claim 13, where the plurality of instructions further cause the one or more processors to:
    determine a second time based on a pattern of movement of the user device with respect to a second geographic location;
    determine the time period based on a difference between the first time and the second time.

15. A method comprising:
  storing, by one or more devices, a user profile associated with a user, the user profile identifying:
    a time period, corresponding to a difference between a first time and a second time,
      the first time corresponding to when a user device, of one or more user devices associated with the user, is anticipated to move from a first geographic location, associated with a local area network, to a second geographic location that is not associated with the local area network, and
      the second time corresponding to when the user device is anticipated to move from the second geographic location to a third geographic location, and
    particular content currently accessed by the user device;
  determining, by the one or more devices, an amount of the particular content to transfer based on the time period; and
  causing, by the one or more devices and prior to the first time, at least the amount of the particular content to automatically transfer to the user device via the local area network.

16. The method of claim 15, further comprising:
  receiving information identifying at least one geographic location of at least one local area network; and
  sending information identifying the at least one geographic location of the at least one local area network to the user device,
    the user device using the information identifying the at least one geographic location to connect to the at least one local area network.

17. A system comprising:
  one or more devices to:
    store a user profile associated with a user, the user profile identifying:
      a time period, corresponding to a difference between a first time and a second time,
        the first time corresponding to when a user device, of one or more user devices associated with the user, is anticipated to move from a first geographic location, associated with a first local area network, to a second geographic location that is not associated with the first local area network,
        the second time corresponding to when the user device is anticipated to move from the second geographic location to a third geographic location,
          the third geographic location corresponding to a second local area network, and
      particular content accessed or identified by the one or more user devices; and
    cause, prior to the first time and based on the time period, the particular content to automatically transfer to the user device via the first local area network.

18. The system of claim 17, where the one or more devices are further to:
  determine an amount of the particular content to transfer based on the time period,
  where when causing the particular content to transfer, the one or more devices are further to:
    cause at least the amount of the particular content to automatically transfer to the user device via the first local area network.

19. The system of claim 17, where the one or more devices are further to:
  determine content currently accessed by the user device;
  identify the currently accessed content as the particular content.

20. The system of claim 17, where the one or more devices are further to:
  send information identifying a geographic location of at least one local area network to the user device,
    the user device using the information identifying the geographic location to connect to the at least one local area network.

* * * * *